United States Patent
Lee et al.

(10) Patent No.: US 10,137,990 B2
(45) Date of Patent: Nov. 27, 2018

(54) ARMREST TABLE

(71) Applicant: LIQ MENG CORP., Taipei (TW)

(72) Inventors: Yen-Chuan Lee, Taipei (TW);
Qing-Kun Yin, Taipei (TW)

(73) Assignee: LIQ MENG CORP., Taipei (TW)

( * ) Notice: Subject to any disclaimer, the term of this patent is extended or adjusted under 35 U.S.C. 154(b) by 110 days.

(21) Appl. No.: 15/356,139

(22) Filed: Nov. 18, 2016

(65) Prior Publication Data

US 2017/0369173 A1  Dec. 28, 2017

(30) Foreign Application Priority Data

Jun. 27, 2016 (CN) .......................... 2016 1 0479423
Jun. 27, 2016 (CN) .......................... 2016 1 0479665

(51) Int. Cl.
| | |
|---|---|
| *B64D 11/06* | (2006.01) |
| *B61D 33/00* | (2006.01) |
| *B61D 37/00* | (2006.01) |

(52) U.S. Cl.
CPC ........ *B64D 11/0638* (2014.12); *B61D 33/005* (2013.01); *B61D 37/00* (2013.01)

(58) Field of Classification Search
CPC .. B64D 11/0638; B64D 11/06; B61D 33/005; B61D 37/00; A47C 7/68; A47C 7/70; B60N 2/242; B60N 3/002; A47B 83/02
USPC ....... 297/145, 144, 173, 150, 155, 160, 154, 297/149
See application file for complete search history.

(56) References Cited

U.S. PATENT DOCUMENTS

| | | | | | |
|---|---|---|---|---|---|
| 2,518,381 | A | * | 8/1950 | Runkles .................... | A47C 7/70 297/145 |
| 2,639,761 | A | * | 5/1953 | Schenzinger ............ | A47C 7/70 108/33 |
| 3,583,760 | A | * | 6/1971 | McGregor ............. | A47B 5/006 297/145 |
| 3,632,161 | A | * | 1/1972 | Arfaras .................... | A47C 7/70 297/145 |
| 4,834,449 | A | * | 5/1989 | Engelman ................ | A47B 3/14 108/134 |

(Continued)

FOREIGN PATENT DOCUMENTS

| | | |
|---|---|---|
| CN | 204184225 U | 3/2015 |
| EP | 0705181 A1 | 4/1996 |

(Continued)

OTHER PUBLICATIONS

EESR of GB.

*Primary Examiner* — Mark R Wendell
(74) *Attorney, Agent, or Firm* — Ming Chow; Sinorica, LLC

(57) ABSTRACT

An armrest table has an armrest casing, a frontward-moving stand, an upward-moving stand, and at least one table panel. The frontward-moving stand is front and rear movably mounted in the armrest casing. The table panel is up and down moveably mounted in the frontward-moving stand. The table panel can be rotated to be horizontal when moved to a highest position of its movement route. The frontward-moving stand and the table panel can be received in the armrest casing when the table panel is moved to a lowest position of its movement route. The armrest table is mounted beside the seat, and thus the passenger can adjust the height of the table panel.

19 Claims, 31 Drawing Sheets

(56) References Cited

U.S. PATENT DOCUMENTS

| | | | | |
|---|---|---|---|---|
| 9,010,885 B2* | 4/2015 | Kahle | ...................... | A47B 3/00 |
| | | | | 108/40 |
| 2014/0300148 A1* | 10/2014 | Frost | ...................... | B64D 11/06 |
| | | | | 297/173 |
| 2016/0167555 A1* | 6/2016 | Allen | ................. | B64D 11/0638 |
| | | | | 108/40 |
| 2016/0272120 A1 | 9/2016 | Johnston et al. | | |

FOREIGN PATENT DOCUMENTS

| | | |
|---|---|---|
| FR | 2743274 A1 | 7/1997 |
| JP | 2015-511557 A | 4/2015 |
| WO | 2015063412 A1 | 5/2015 |

* cited by examiner

ARMREST TABLE

CROSS-REFERENCE TO RELATED APPLICATIONS

This application is based upon and claims priority under 35 U.S.C. 119 from China Patent Application No. 201610479665.4 filed on Jun. 27, 2016 and China Patent Application No. 201610479423.5 filed on Jun. 27, 2016, which are hereby specifically incorporated herein by this reference thereto.

BACKGROUND OF THE INVENTION

1. Field of the Invention

The present invention relates to an armrest mounted beside a seat, especially to an armrest that can be used as a table.

2. Description of the Prior Arts

In various large transportation vehicles or carriers, such as a train or an airplane, there is a table panel mounted to a seat for a passenger to use. However, the conventional table panel is often mounted on a back of a seatback of a seat that is in front of the passenger, and this design has the following shortcomings:

First, when a passenger seated at a front row is adjusting the seatback, the angular position and height of the table panel of a next-row passenger are both affected. In other words, the passenger cannot control the angular position and the height of his own table panel.

Second, in the seats of the first row, because there are no more seats disposed in front of the seats of the first row, the wall in front of the seats of the first row must be installed with table panels additionally. Besides, in the seats of the last row, the seatbacks do not need to be mounted with the table panels since there are no passengers in back of the seats of the last row. But all the seats are identical in structure and design due to mass production, and thus the seats of the last row are still mounted with the table panels in their seatbacks even though said table panels are useless.

To overcome the shortcomings, the present invention provides an armrest table to mitigate or obviate the aforementioned problems.

SUMMARY OF THE INVENTION

The main objective of the present invention is to provide an armrest table that is mounted beside a seat and thus can be adjusted by the passenger seated on the seat. The armrest table has an armrest casing having
  an inner space;
  a front opening communicating with the inner space of the armrest casing;
a frontward-moving stand front and rear movably mounted in the armrest casing, capable of moving out of the front opening of the armrest casing, and having
  an inner space;
  a top opening communicating with the inner space of the frontward-moving stand;
at least one table panel up and down moveably mounted in the frontward-moving stand, and capable of moving out of the top opening of the frontward-moving stand;

wherein when the at least one table panel is moved to a highest position of its movement route, the at least one table panel is rotatable to be horizontal;

wherein when the at least one table panel is moved to a lowest position of its movement route, the frontward-moving stand and the at least one table panel are capable of being received in the armrest casing.

Normally, the armrest table can be used as an armrest. When the passenger wants to use it as a table, the frontward-moving stand is moved forward out of the armrest casing. Then, the table panel is moved upward out of the frontward-moving stand, and finally the table panel is rotated to be horizontal. Compared with the conventional table panel, which is mounted on the seatback of the front seat and may be adjusted in height by the front passenger, the table panel of the present invention is mounted beside the seat, and thus each passenger can adjust the height of his own table panel. In addition, the manufacturer also does not need to make particular design for the seats of the first row and the last row.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
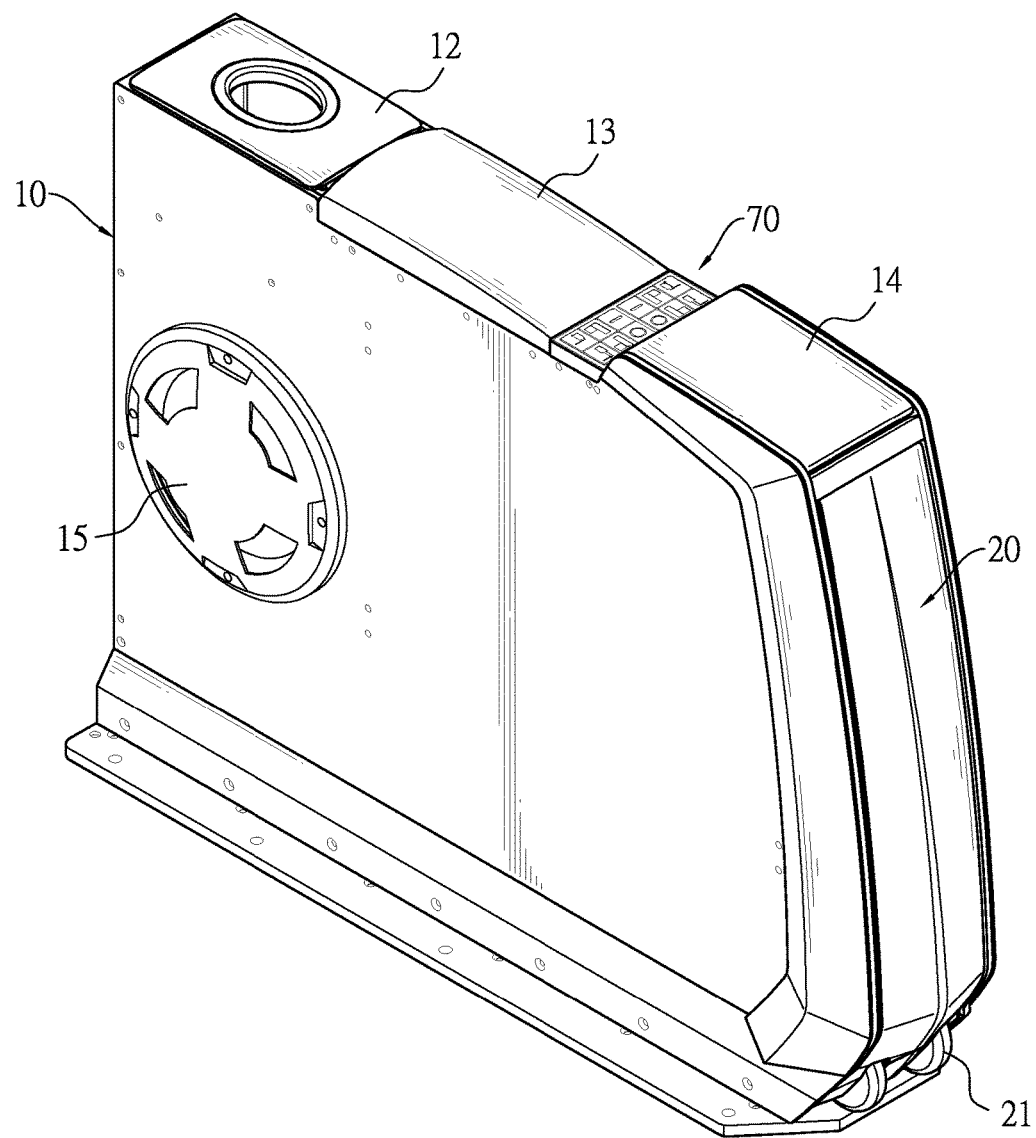
FIG. 1 is a perspective view of a first embodiment of an armrest table in accordance with the present invention, shown used as an armrest.
Figure 2:
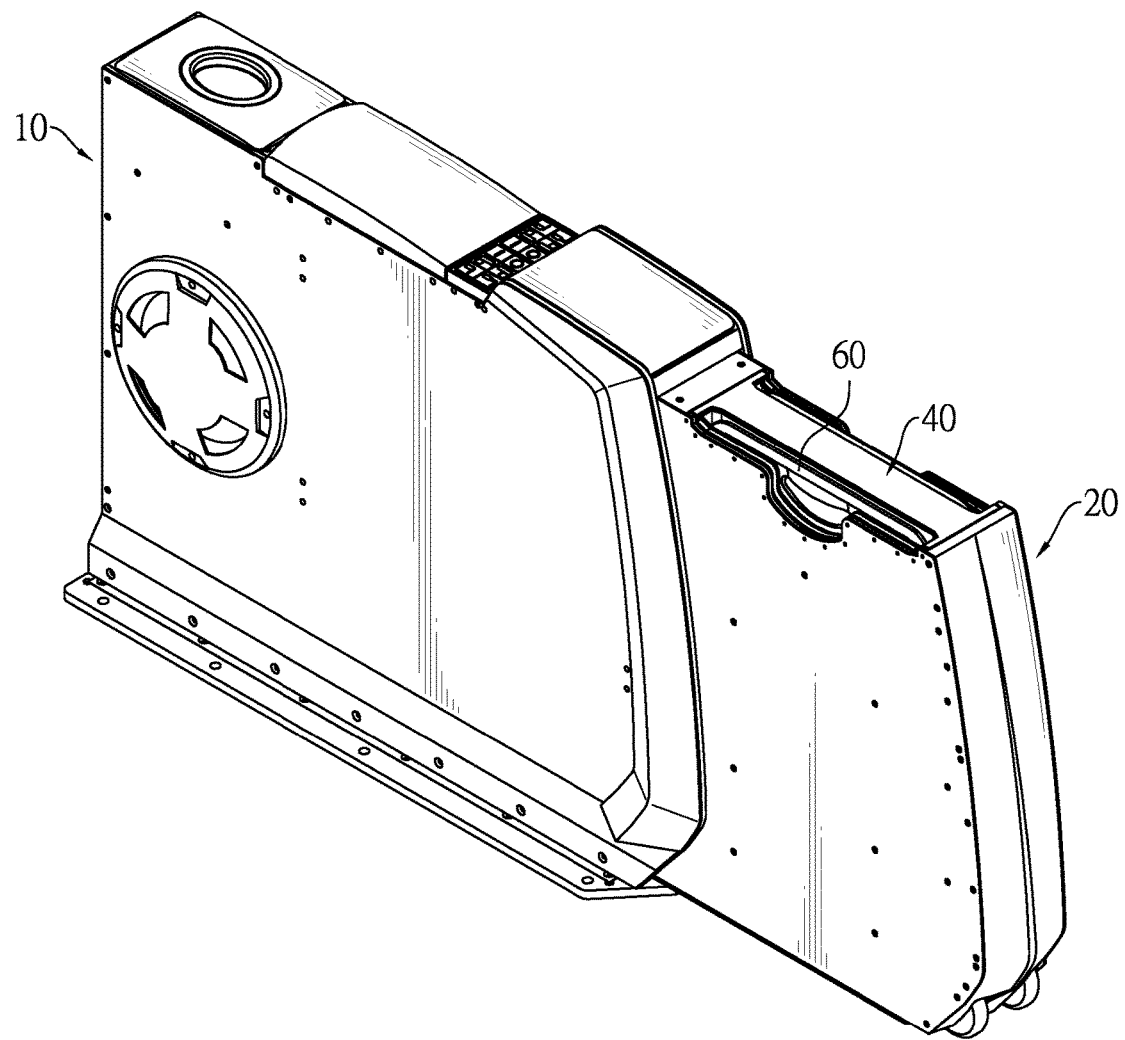
FIG. 2 is an operational perspective view of the armrest table in FIG. 1, showing a frontward-moving stand moved out.
Figure 3:
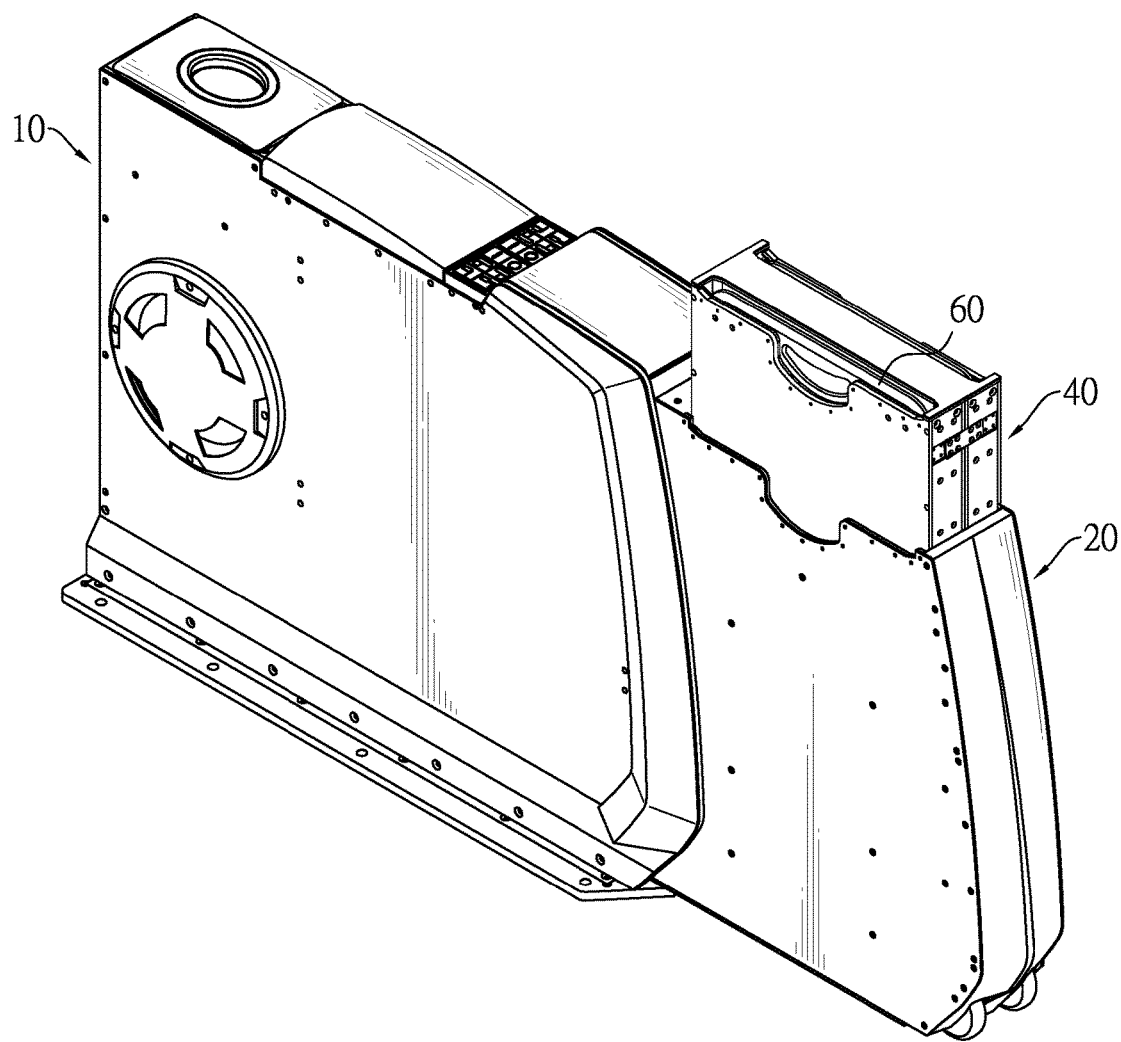
FIG. 3 is an operational perspective view of the armrest table in FIG. 1, showing an upward-moving stand moved out.
Figure 4:
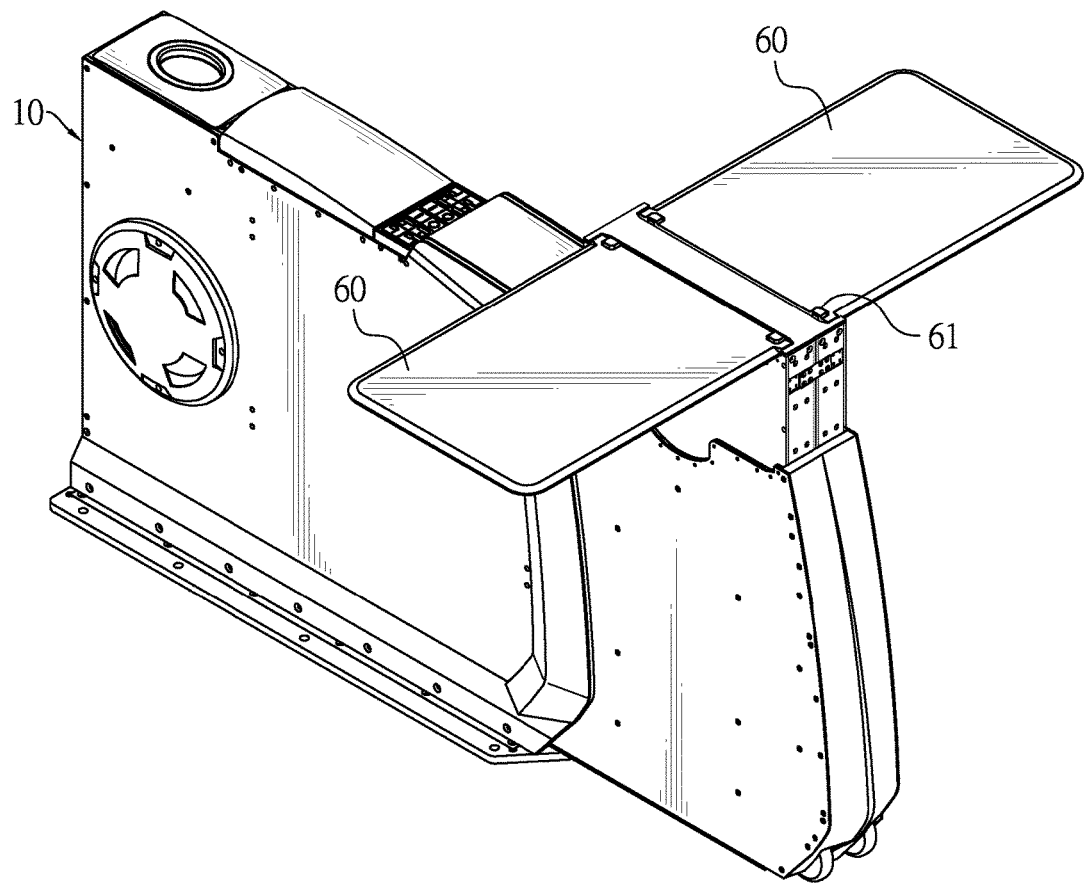
FIG. 4 is an operational perspective view of the armrest table in FIG. 1, showing two table panels horizontally disposed.
Figure 5:
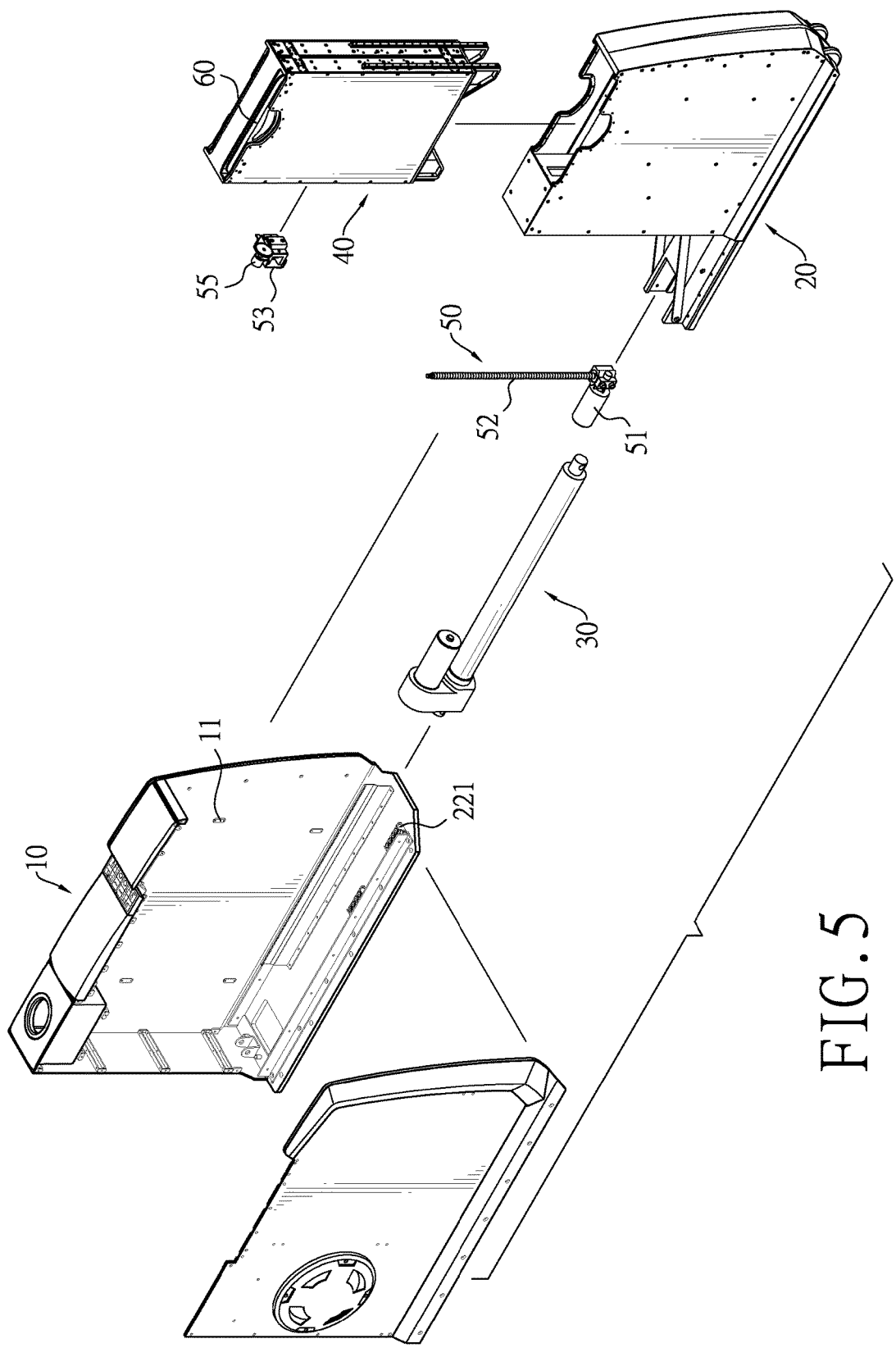
FIG. 5 is an exploded perspective view of the armrest table in FIG. 1.
Figure 6:
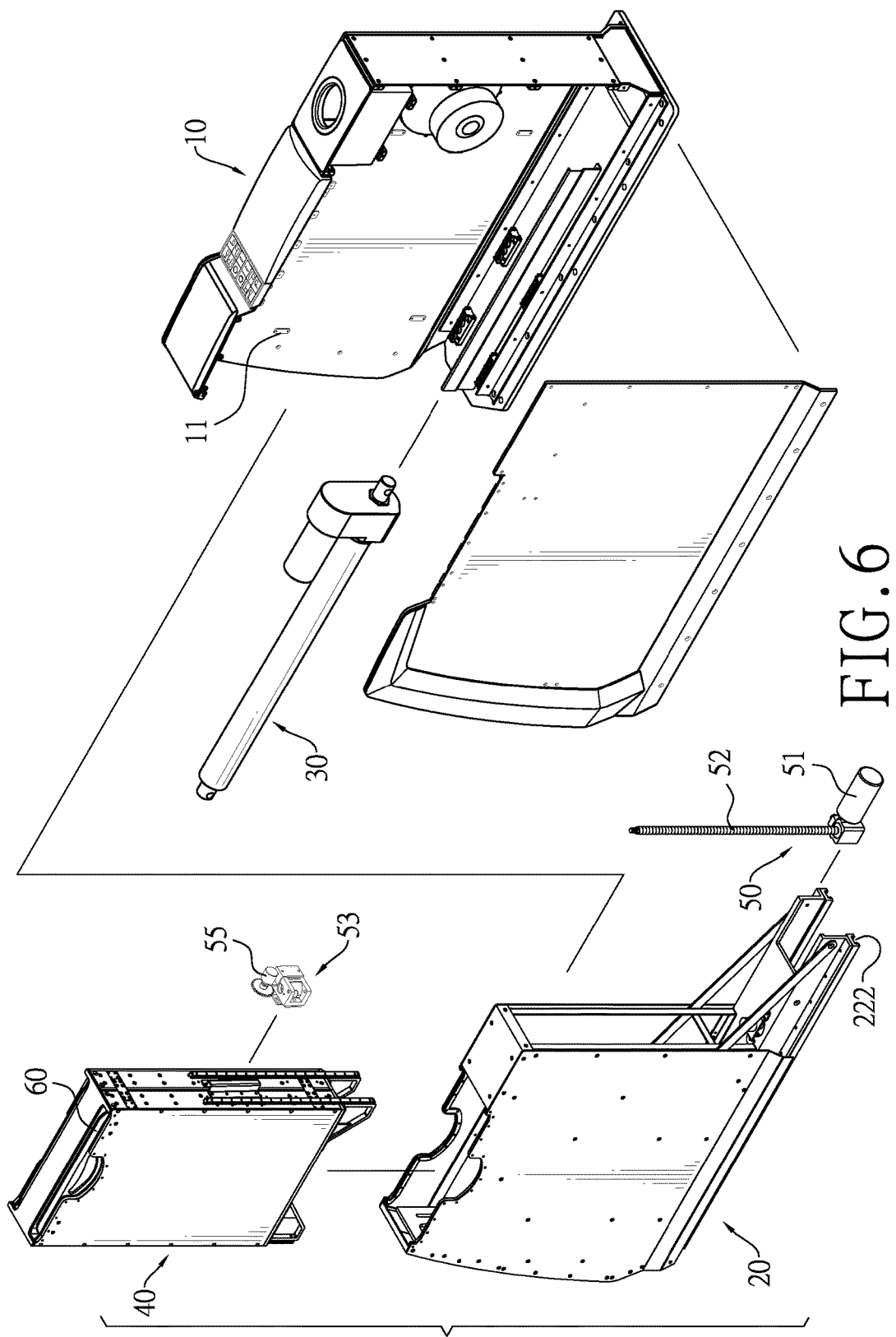
FIG. 6 is another exploded perspective view of the armrest table in FIG. 1.
Figure 7:
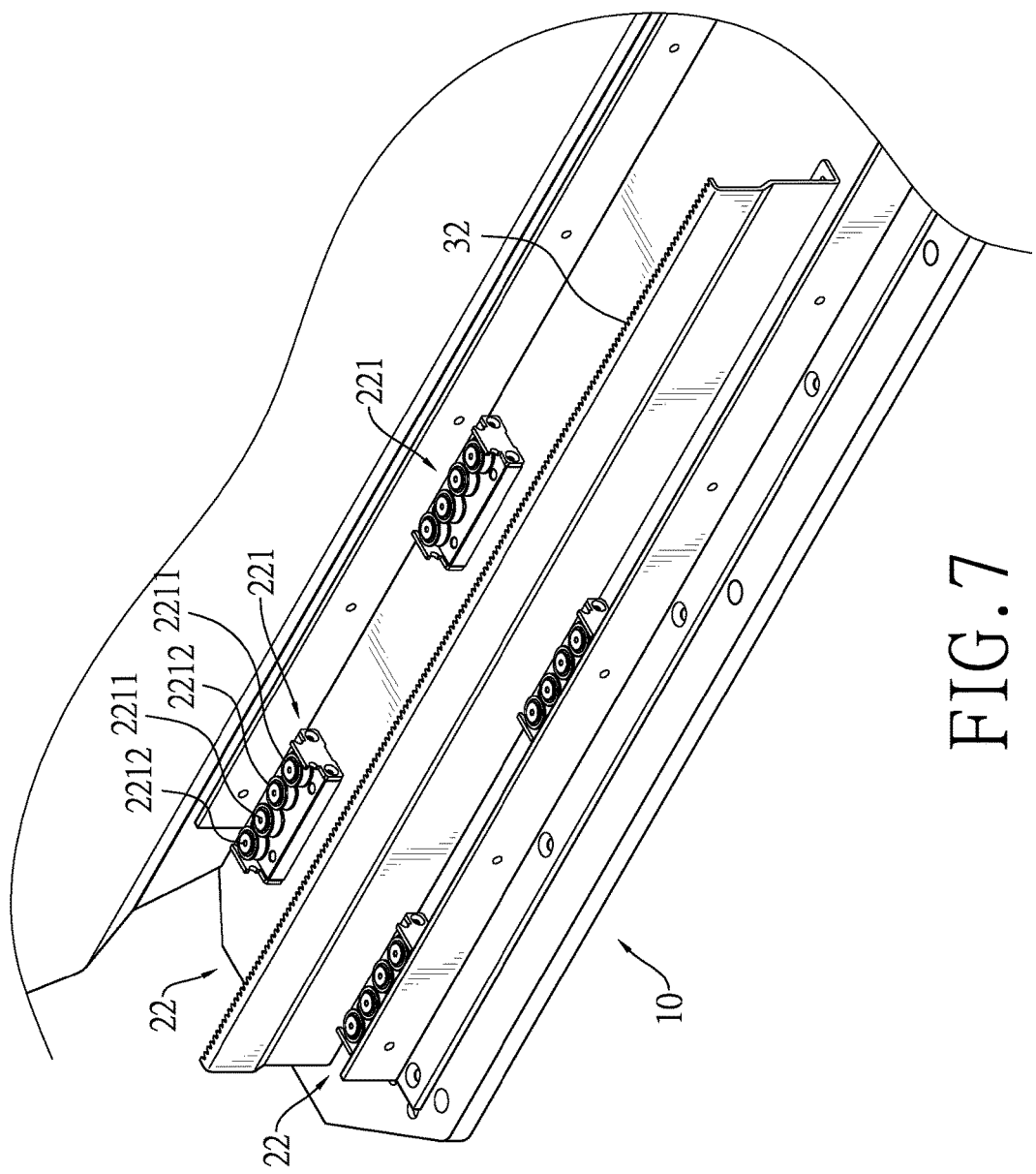
FIG. 7 is a perspective view of bearing assemblies and frontward-moving gear racks in an armrest casing of the armrest table in FIG. 1.
Figure 8:
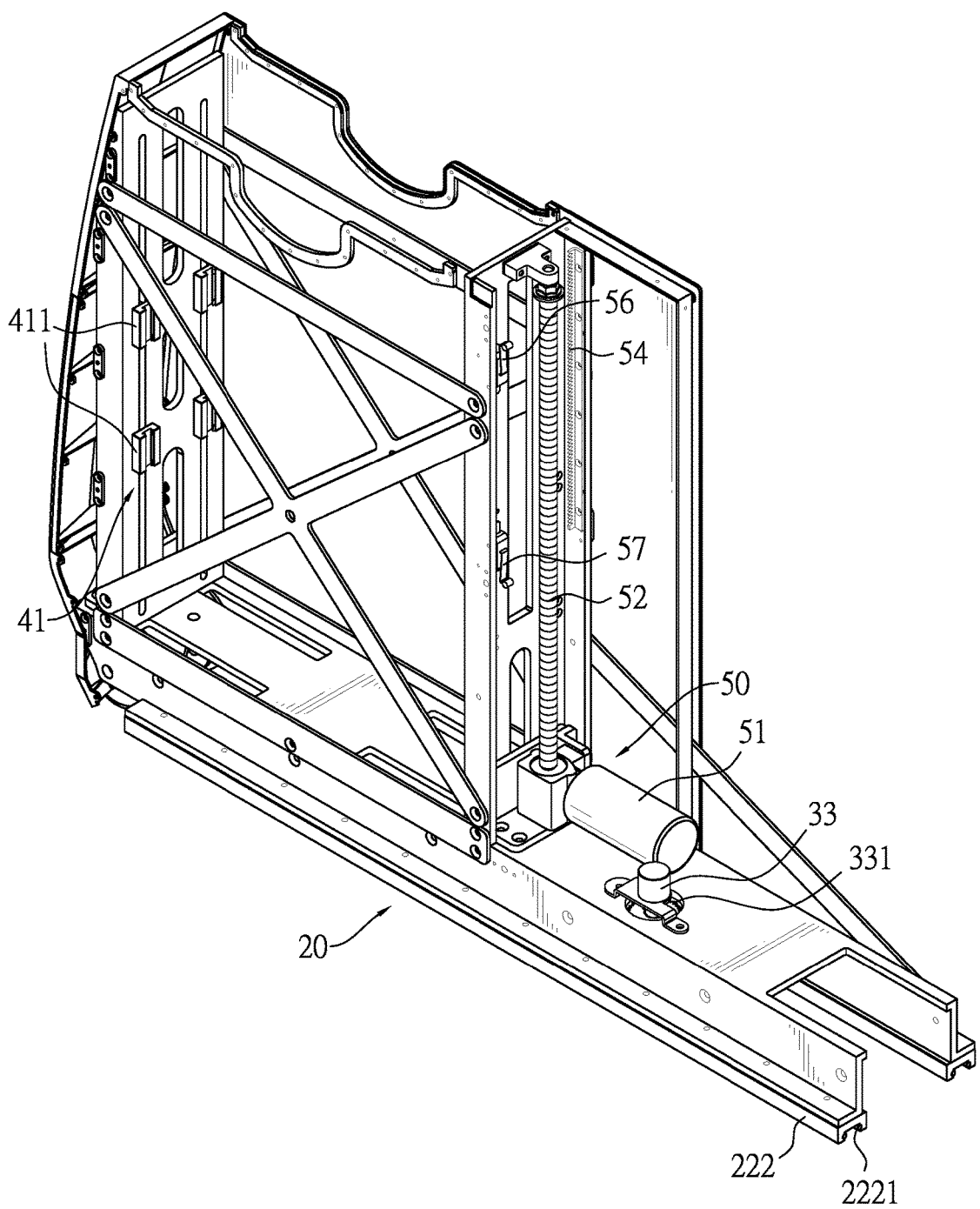
FIG. 8 is a perspective view of the frontward-moving stand of the armrest table in FIG. 1.
Figure 9:
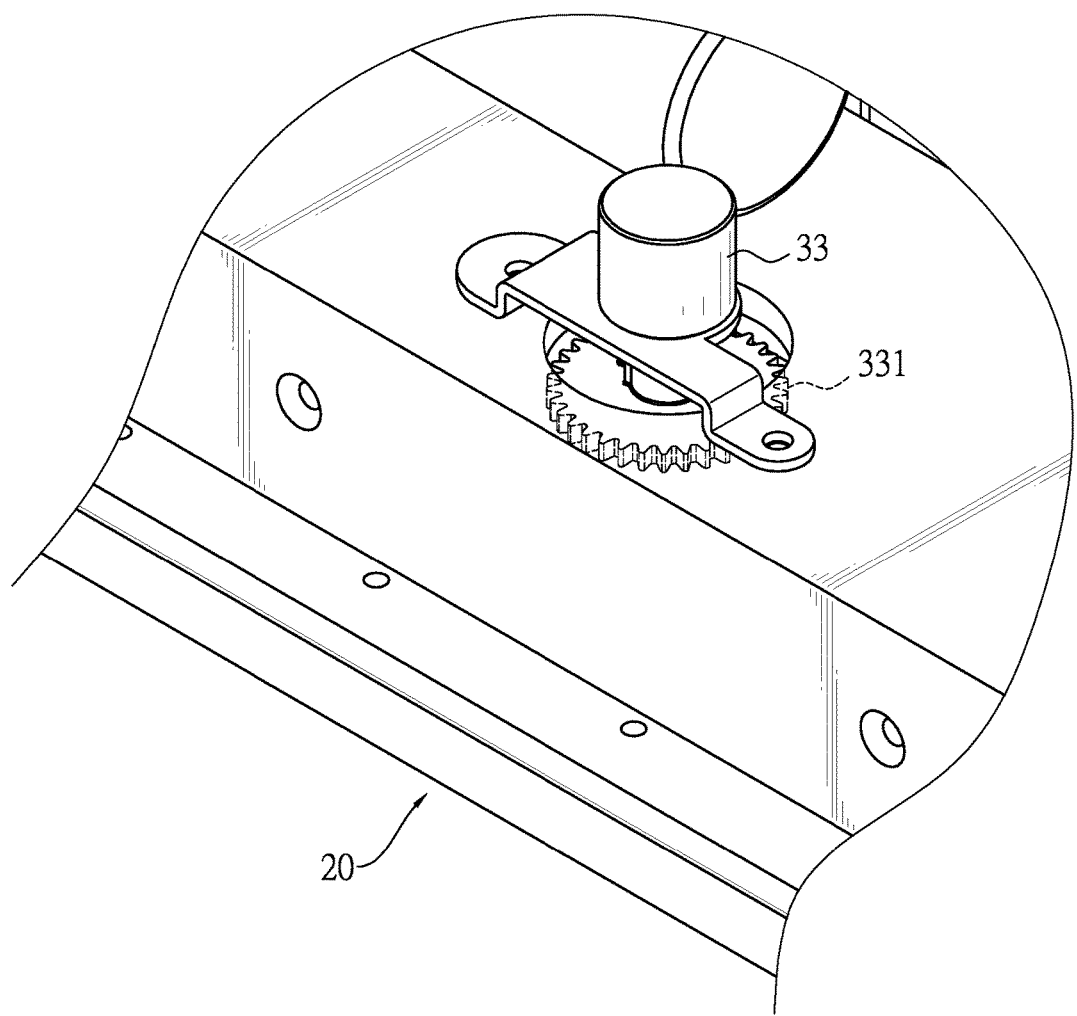
FIG. 9 is a perspective view of a frontward-moving potentiometer of the armrest table in FIG. 1.
Figure 10:
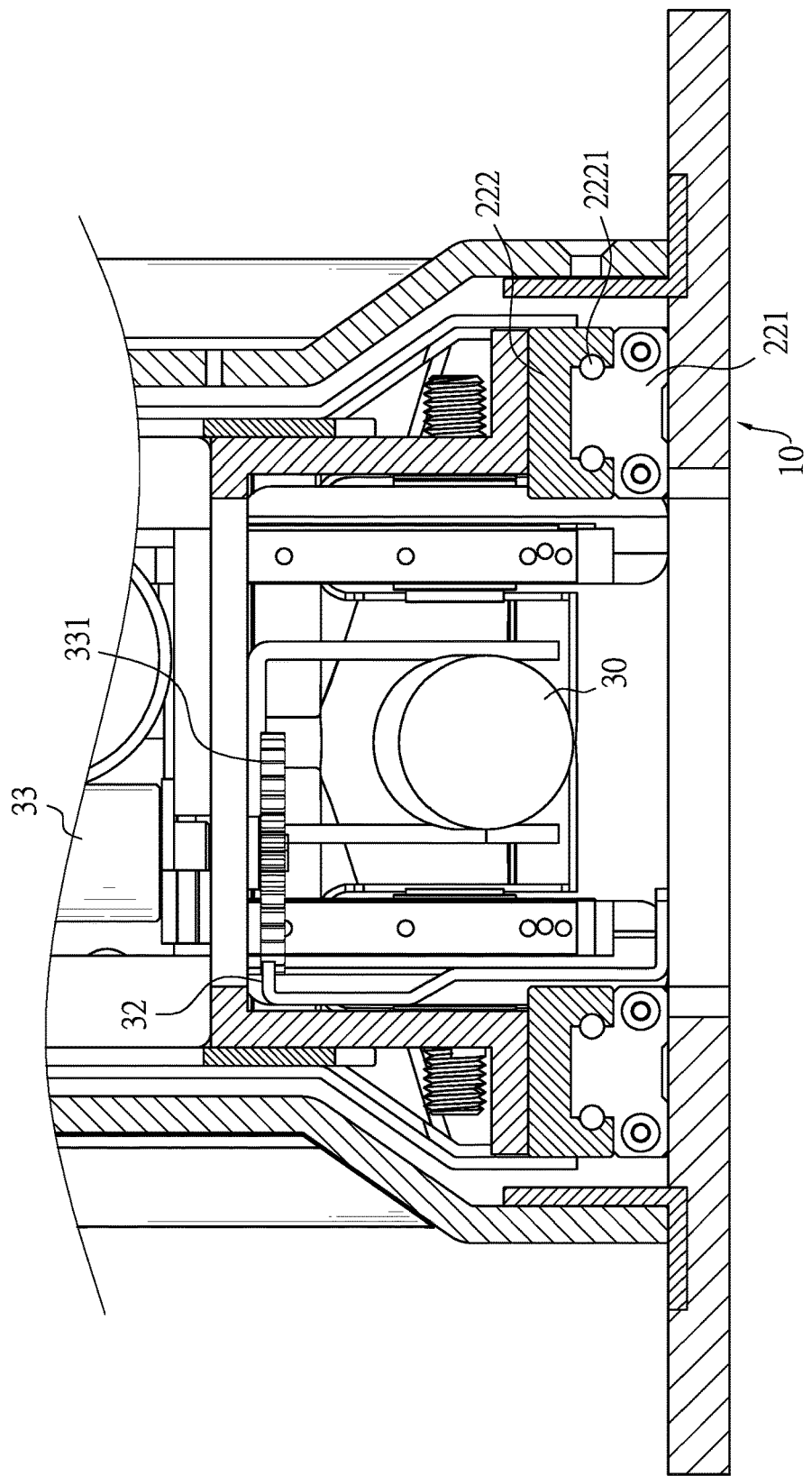
FIG. 10 is a back view in partial section of frontward-moving channel assemblies, the frontward-moving gear racks, and the frontward-moving gears of the armrest table in FIG. 1.
Figure 11:
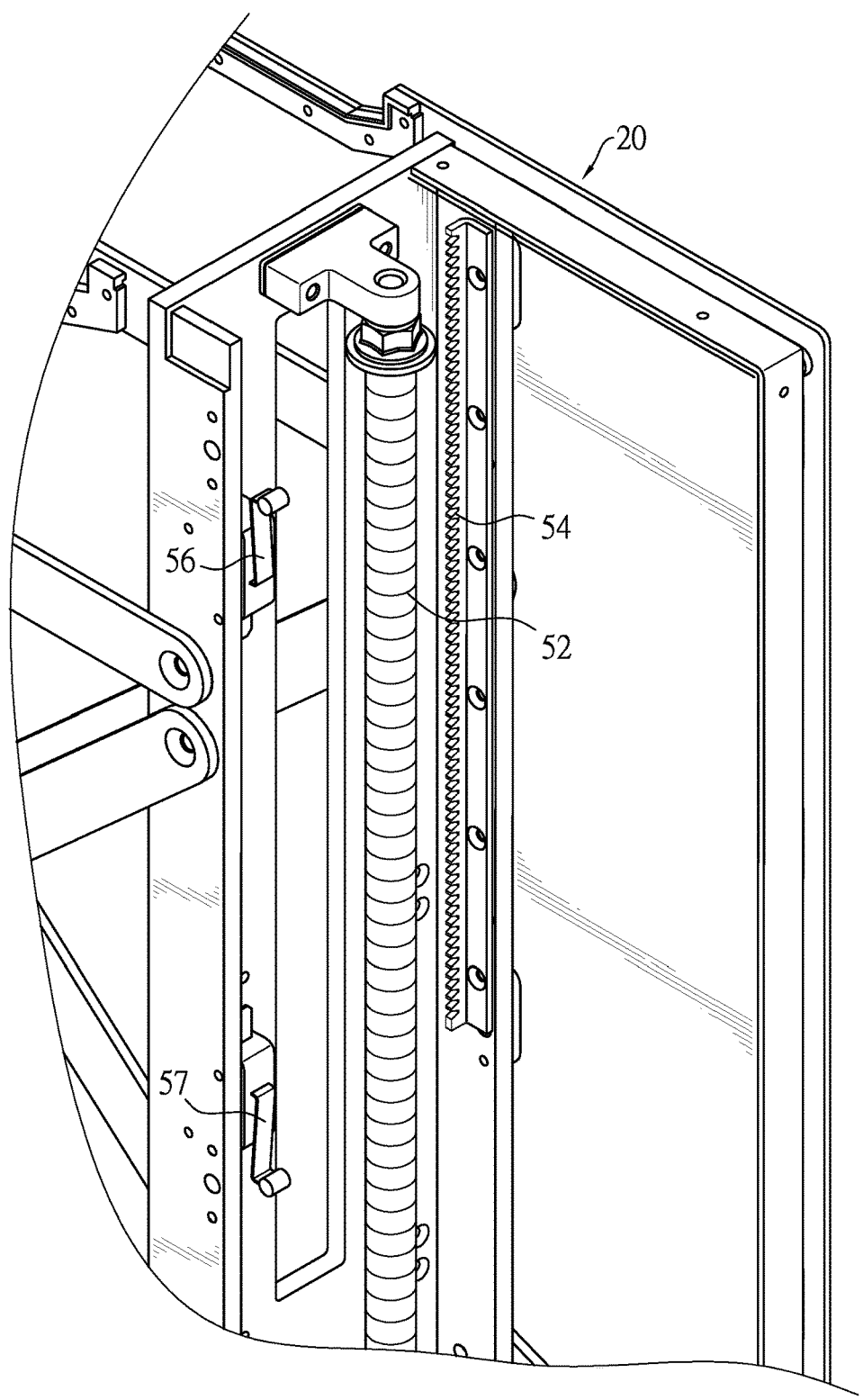
FIG. 11 is a perspective view of a threaded rod and an upward-moving gear rack on the frontward-moving stand, an upper stand contact switch, and a lower stand contact switch of the armrest table in FIG. 1.
Figure 12:
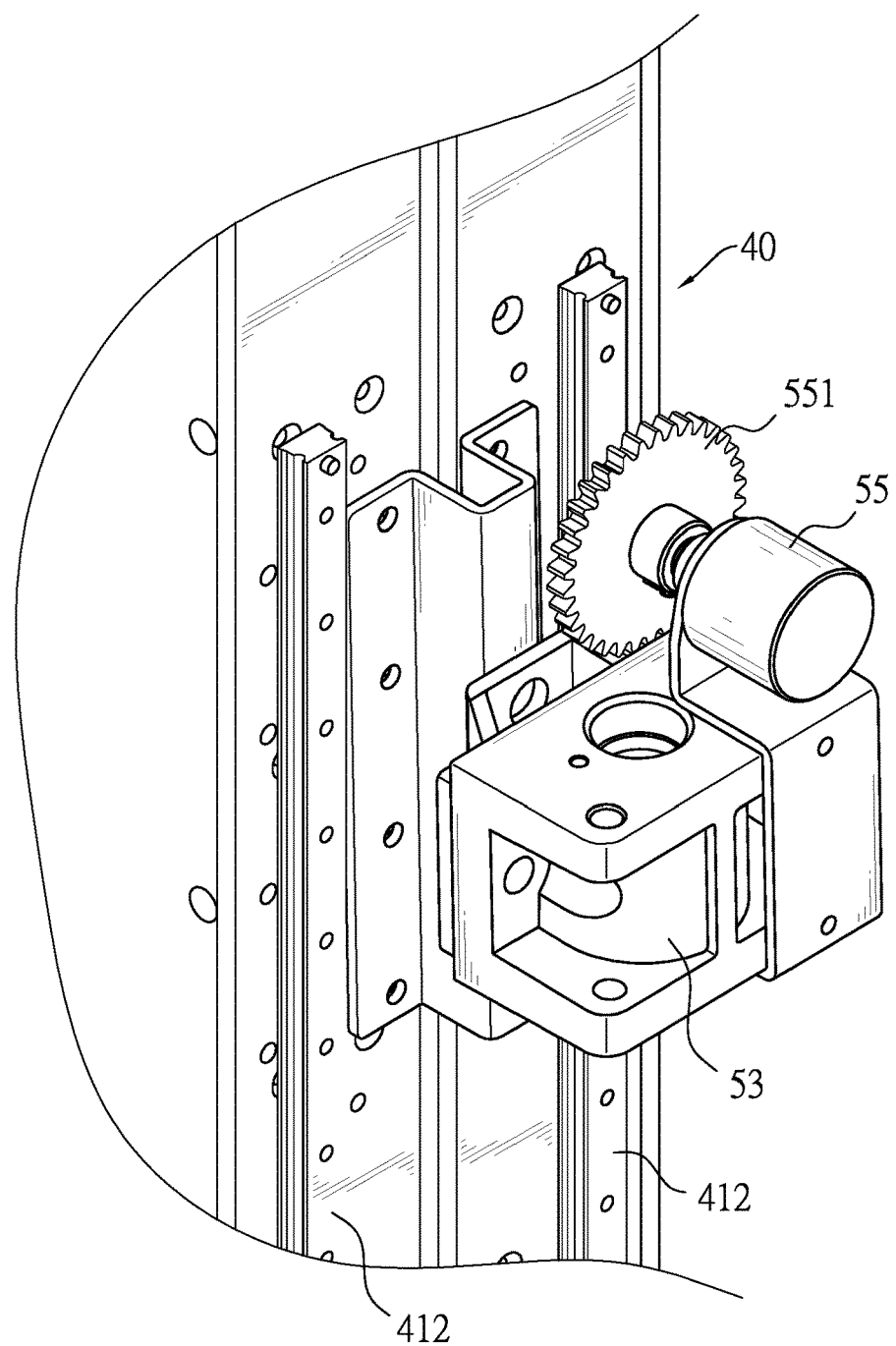
FIG. 12 is a perspective view of a nut, an upward-moving potentiometer, and slide channels of the armrest table in FIG. 1.
Figure 13:
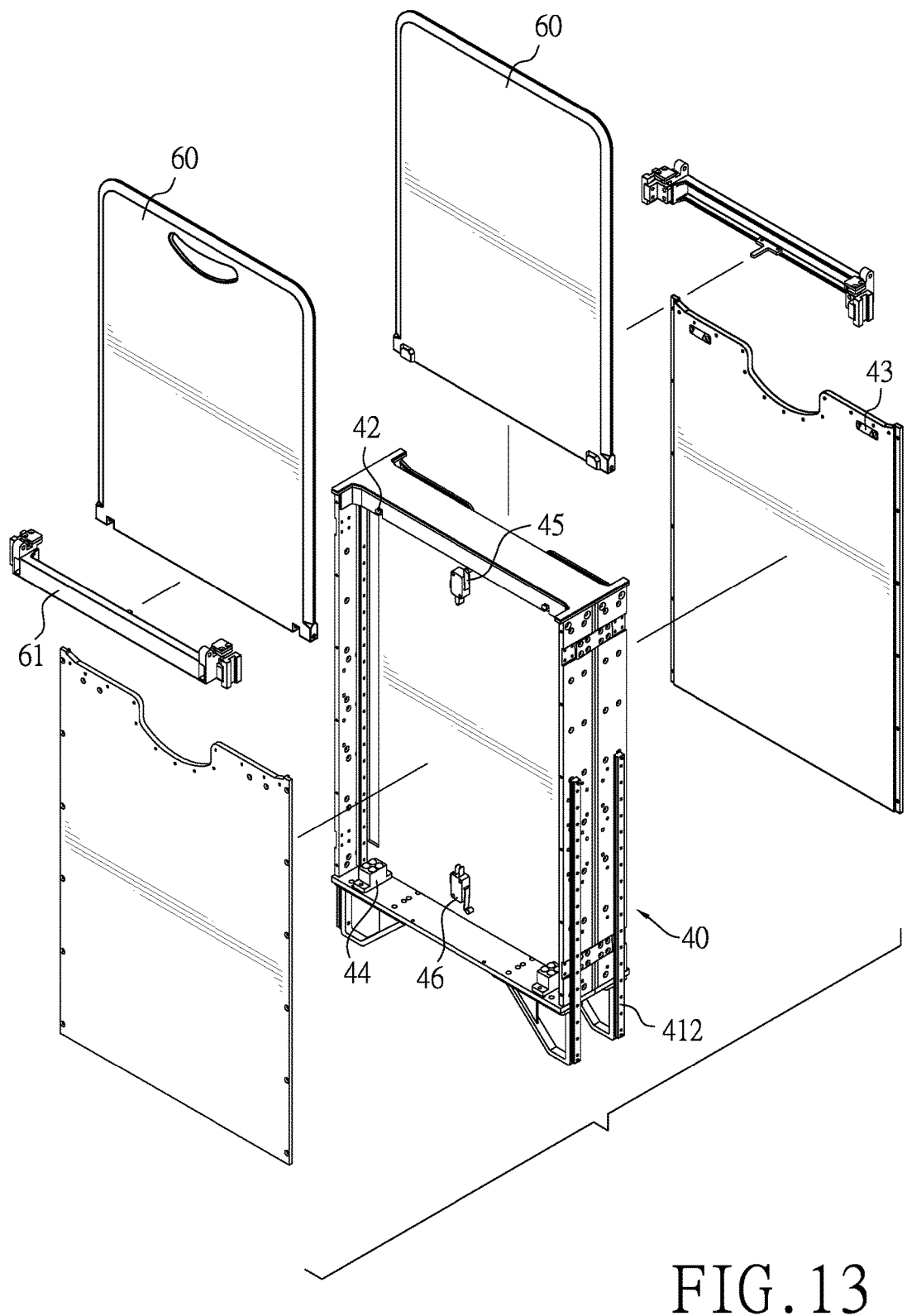
FIG. 13 is an exploded perspective view of the upward-moving stand of the armrest table in FIG. 1.
Figure 14:
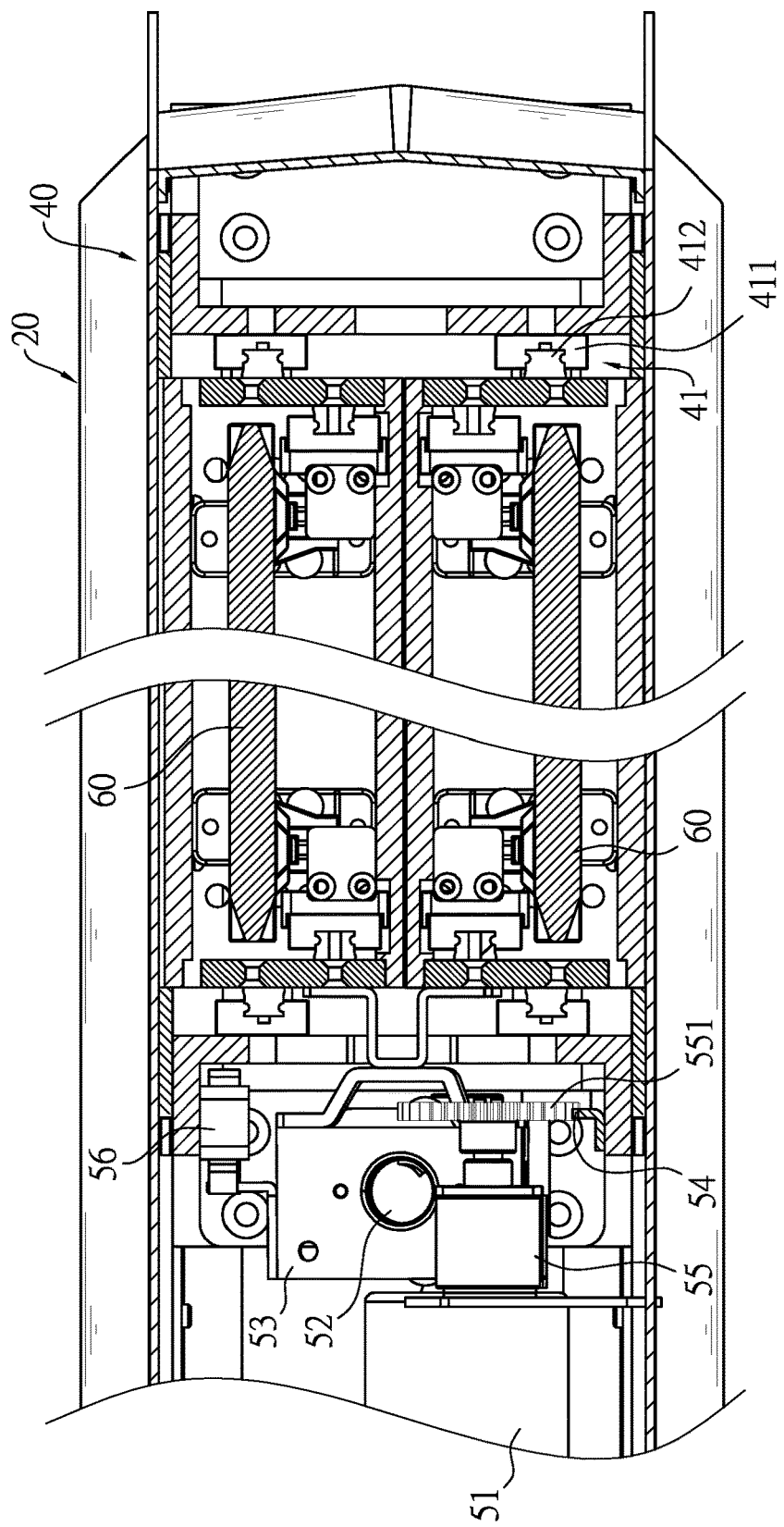
FIG. 14 is a top view in partial section of a frontward-moving stand, an upward-moving stand, and the table panels of the armrest table in FIG. 1.

With reference to FIGS. 1, 3, 5, and 6, a first embodiment of an armrest table in accordance with the present invention comprises an armrest casing 10, a frontward-moving stand 20, a frontward-moving power device 30, an upward-moving stand 40, an upward-moving power device 50, two table panels 60, a control panel 70, and a control system.

The armrest casing 10 has an inner space and a front opening communicating with the inner space.

With reference to FIGS. 5 to 7 and 10, the frontward-moving stand 20 is front and rear movably mounted in the armrest casing 10, is capable of moving out of the front opening of the armrest 10, and has an inner space and a top opening communicating with the inner space of the frontward-moving stand 20. In a preferred embodiment, the frontward-moving stand 20 has two wheels 21. The two wheels 21 are mounted on a bottom of the frontward-moving stand 20, are adjacent to a front end of the frontward-moving stand 20, and are arranged apart transversely from each other.

Two frontward-moving channel assemblies 22 are mounted between the armrest casing 10 and the bottom of the frontward-moving stand 20, and are arranged transversely apart from each other. Each frontward-moving channel assembly 22 has two bearing assemblies 221 and a frontward-moving channel stand 222. The two bearing assemblies 221 are mounted on a bottom of the inner space of the armrest casing 10, and are arranged front and rear apart from each other. Each bearing assembly 221 has multiple left bearings 2211 and multiple right bearings 2212. The left bearings 2211 are arranged front and rear apart from each other. The right bearings 2212 are arranged front and rear apart from each other. Leftmost sides of the left bearings 2211 extend beyond leftmost sides of the right bearings 2212. Rightmost sides of the right bearings 2212 extend beyond rightmost sides of the left bearings 2211. The frontward-moving channel stand 222 is mounted securely on the bottom of the frontward-moving stand 20, extends front and rear, and has two channel rods 2221. The two channel rods 2221 are arranged transversely apart from each other, and front and rear slidably clamp the leftmost sides of the left bearings 2211 and the rightmost sides of the right bearings 2212. The wheels 21 and the bearings 2211, 2212 facilitate smooth slide of the frontward-moving stand 20 relative to the armrest casing 10. The two channel rods 2221 clamping the bearings 2211, 2212 make the frontward-moving stand 20 stably move relative to the armrest casing 10.

The armrest casing 10 has multiple rigid rubber abutters 11 mounted on two opposite sides of an inner wall of the armrest casing 10 and clamping the frontward-moving stand 20 when the frontward-moving stand 20 is moved back into the armrest casing 10.

With reference to FIGS. 6 and 8 to 10, the frontward-moving power device 30 is mounted in the armrest casing 10, is connected to the frontward-moving stand 20, and is capable of moving the frontward-moving stand 20 front and rear. In a preferred embodiment, the frontward-moving power device 30 has a pusher motor 31, a frontward-moving gear rack 32, and a frontward-moving potentiometer 33. The pusher motor 31 is mounted on the bottom of the inner space of the armrest casing 10 and has a pushing rod 311. The pushing rod 311 is movable and is connected securely to the frontward-moving stand 20 to move the frontward-moving stand 20 front and rear. The frontward-moving gear rack 32 is mounted in the armrest casing 10 and extends front and rear. The frontward-moving potentiometer 33 is mounted on the frontward-moving stand 20, is electrically connected to the control system, and has a frontward-moving gear 331. The frontward-moving gear 331 is rotatable and engages with the frontward-moving gear rack 32. Thus, a moving distance of the frontward-moving stand 20 can be calculated by the frontward-moving potentiometer 33. The pusher motor 31 and the frontward-moving potentiometer 33 are electrically connected to the control system, and thus the control system can assist in controlling the pusher motor 31 according to the moving distance calculated by the frontward-moving potentiometer 33.

With reference to FIGS. 6, 8, and 12 to 14, the upward-moving stand 40 is up and down movably mounted in the frontward-moving stand 20, is capable of moving out of the top opening of the frontward-moving stand 20, and has an inner space and two table panel openings. The two table panel openings communicate with the inner space, are formed in a top of the upward-moving stand 40, and are arranged transversely apart from each other.

In a preferred embodiment, two upward-moving channel assemblies 41 are mounted between the frontward-moving stand 20 and the upward-moving stand 40, and are respectively mounted on a front surface and a rear surface of the upward-moving stand 40. Each upward-moving channel assembly 41 has multiple slide channel stands 411 and two slide channels 412. The slide channel stands 411 are mounted on a front side or a rear side of an inner wall of the frontward-moving stand 20. The slide channel stands 411 are divided into two groups. The two groups of the slide channel stands 411 are arranged transversely apart from each other. The slide channel stands 411 in each group are arranged vertically apart from each other. The slide channels 412 are mounted on the front surface or the rear surface of the upward-moving stand 40, are arranged transversely apart from each other, extend up and down, and slidably engage the two groups of the slide channel stands 411, thereby making the upward-moving stand 40 stably move relative to the frontward-moving stand 20.

With reference to FIGS. 8 and 11 to 14, the upward-moving power device 50 is mounted on the frontward-moving stand 20, is connected to the upward-moving stand 40, and is capable of moving the upward-moving stand 40 up and down. In a preferred embodiment, the upward-moving power device 50 has a motor 51, a threaded rod 52, a nut 53, an upward-moving gear rack 54, an upward-moving potentiometer 55, an upper stand contact switch 56, and a lower stand contact switch 57. The motor 51 is mounted on the frontward-moving stand 20. The threaded rod 52 is vertically connected to the motor 51 and is rotated by the motor 51. The nut 53 is mounted securely on a rear wall of the upward-moving stand 40, and is mounted around and screwed with the threaded rod 52. The upward-moving stand 40 is mounted in the frontward-moving stand 20, and a front side and a rear side of the upward-moving stand 20 are connected to the frontward-moving stand 20 by the upward-moving channel assembly 41, such that the upward-moving stand 40 and the nut 53 cannot be rotatable relative to the frontward-moving stand 20. Thus, when the motor 51 rotates the threaded rod 52, the nut 53 and the upward-moving stand 40 are moved upward or downward.

The upward-moving gear rack 54 is mounted on the frontward-moving stand 20, and extends up and down. The upward-moving potentiometer 55 is mounted securely on the rear wall of the upward-moving stand 40, and has an upward-moving gear 551. The upward-moving gear 551 is rotatable, and engages with the upward-moving gear rack 54. Thus, a moving distance of the upward-moving stand 40 can be calculated by the upward-moving potentiometer 55.

The upper stand contact switch 56 and the lower stand contact switch 57 are mounted on the frontward-moving stand 20, and are vertically arranged apart from each other. The upper stand contact switch 56 or the lower stand contact switch 57 is actuated by the upward-moving stand 40 when the upward-moving stand 40 is moved upward or downward.

The motor 51, the upward-moving potentiometer 55, the upper stand contact switch 56 and the lower stand contact switch 57 are electrically connected to the control system. Thus, the control system can assist in controlling the motor 51 according to the moving distance calculated by the upward-moving potentiometer 55 and a position of the upward-moving stand 40 detected by the upper stand contact switch 56 and the lower stand contact switch 57.

Figure 15:
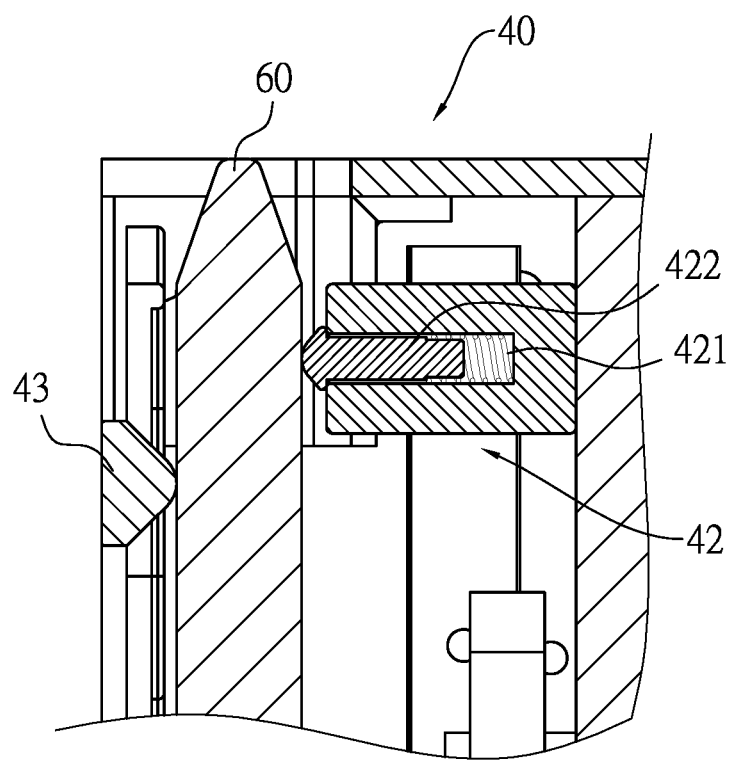
FIG. 15 is a front view in partial section of a pushing device of the armrest table in FIG. 1.
Figure 16:
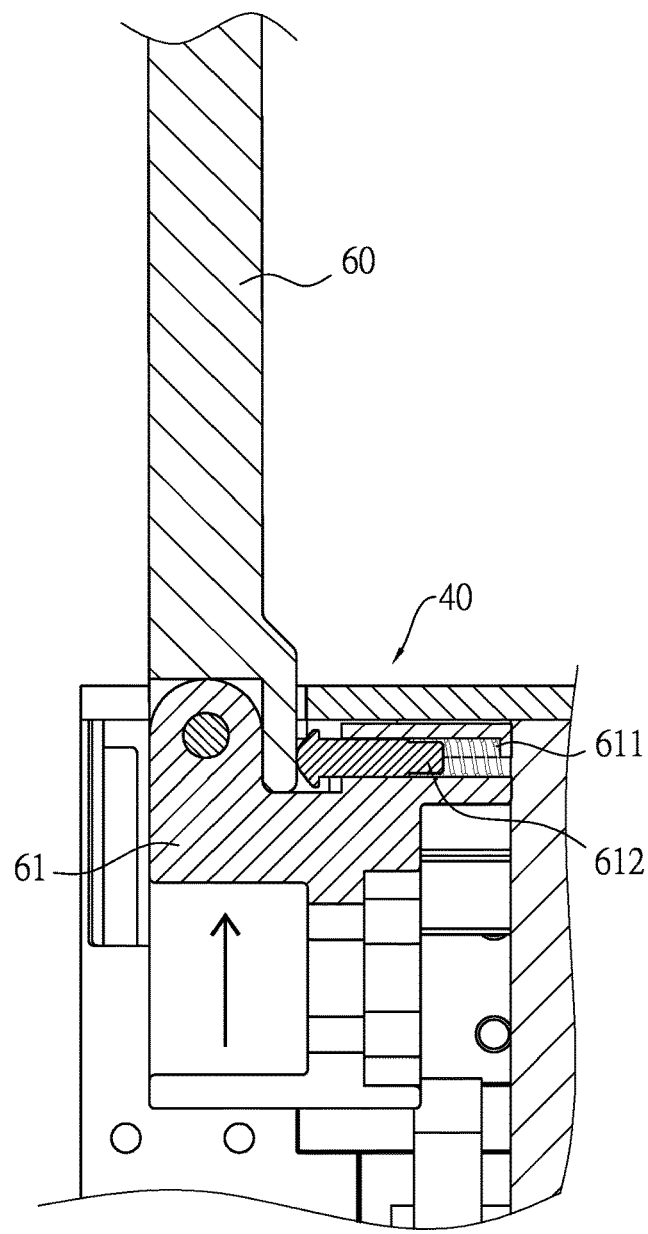
FIG. 16 is an operational front view in partial section of a first abutter of the armrest table in FIG. 1, showing the table panel moved up to a highest position of its movement route.

With reference to FIGS. 13 to 17, the two table panels 60 are up and down moveably mounted in the upward-moving stand 40, and are capable of moving out of the two table panel openings of the upward-moving stand 40 respectively. In a preferred embodiment, the upward-moving stand 40 has multiple pushing devices 42. The pushing devices 42 are mounted on an inner wall of the upward-moving stand 40, and are disposed adjacent to the two table panel openings of the upward-moving stand 40. The pushing devices 42 are divided into two groups, and the two groups of the pushing devices 42 respectively correspond to the two table panels 60. The pushing devices 42 in each group are arranged transversely apart from each other. Each pushing device 42 has a second abutter 422 and a second resilient element 421. The second resilient element 421 pushes the second abutter 422 to make the second abutter 422 abut against the corresponding table panel 60. The upward-moving stand 40 has multiple rigid rubber abutters 43 mounted on the inner wall of the upward-moving stand 40, and clamping the corresponding table panel 60 when said table panel 60 is moved downward into the upward-moving stand 40. Thus, the table panel 60 is stably mounted in the upward-moving stand 40 as shown in FIG. 15.

Figure 17:
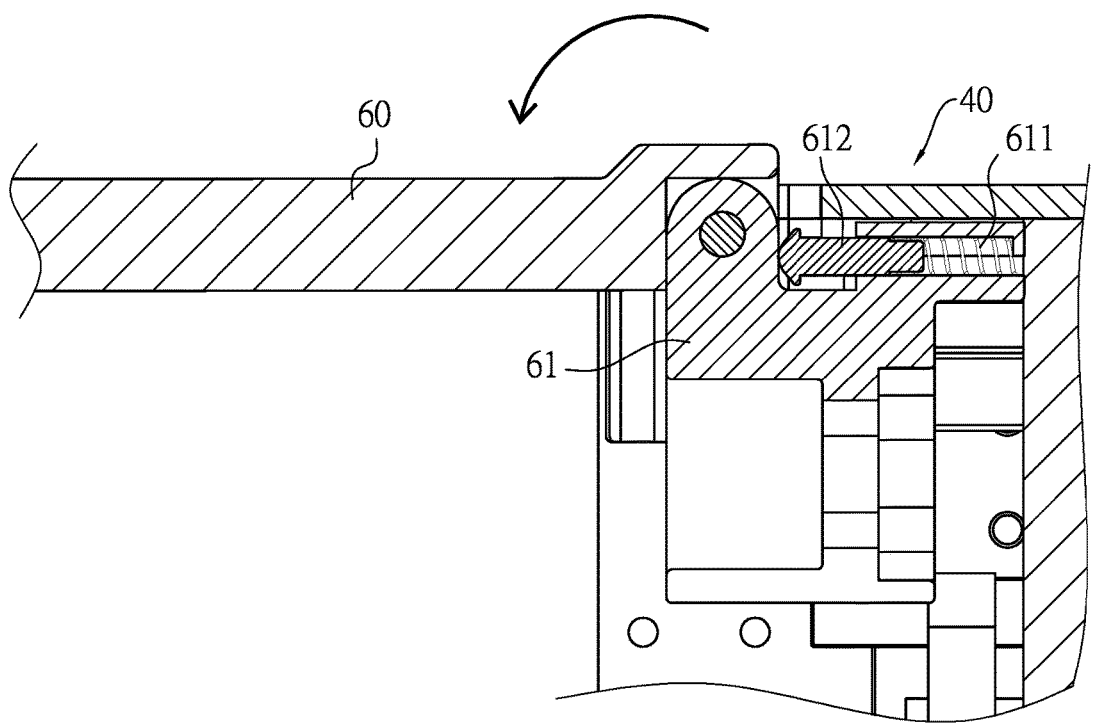
FIG. 17 is an operational front view in partial section of the first abutter of the armrest table in FIG. 1, showing the table panel rotated to be horizontal.

Each table panel 60 has an engaging frame 61, two first abutters 611, and two first resilient elements 612. The engaging frame 61 is pivotally connected to a bottom side of the table panel 60. The two first abutters 611 and the two first resilient elements 612 are mounted on the engaging frame 61. The two first resilient elements 612 respectively push the two first abutters 611 to make the first abutters 612 abut against the table panel 60. When the two table panels 60 are moved to a highest position of their movement route, the two table panels 60 are capable of rotating respectively toward two opposite sides to be horizontal. When the table panel 60 is moved to the highest position but not rotated yet, the first abutters 612 abut the table panel 60 to prevent the table panel 60 from being reclined transversely. But when the user rotates the table panel 60, the table panel 60 is rotated until the bottom side of the table panel 60 abuts the engaging frame 61. At this time, the table panel 60 is disposed horizontally as shown in FIG. 17.

The upward-moving stand 40 has multiple cushions 44 mounted on a bottom of the inner space of the upward-moving stand 40 for the table panel 60 to abut, thereby avoiding noise and damage.

Two table panel contact devices are mounted in the upward-moving stand 40 and respectively correspond to the two table panels 60. Each table panel contact device has an upper panel contact switch 45 and a lower panel contact switch 46. The upper panel contact switch 45 and the lower panel contact switch 46 are mounted on the inner wall of the upward-moving stand 40, and are vertically arranged apart from each other. When the table panel 60 is moved to the highest position of its movement route, the table panel 60 actuates the upper panel contact switch 45. When the table panel 60 is moved to a lowest position of its movement route, the table panel 60 actuates the lower panel contact switch 46. The upper panel contact switch 45 and the lower panel contact switch 46 are electrically connected to the control system, such that the control system can identify whether the table panel 60 protrudes out of the upward-moving stand 40 or not by the upper panel contact switch 45 and the lower panel contact switch 46.

In a preferred embodiment, the upward-moving stand 40 is installed with two table panels 60. But the upward-moving stand 40 also can be installed with one single table panel 60. In addition, the upward-moving stand 40 with one single table panel 60 also can be modularized. When the armrest table needs two table panels 60, the two modularized upward-moving stands 40 are assembled, thereby facilitating easy assembly.

When the two table panels 60 are moved to the lowest position of their movement route and the upward-moving stand 40 is moved to a lowest position of its movement route, the frontward-moving stand 20, the upward-moving stand 40 and the two table panels 60 are capable of being received in the armrest casing 10.

The control panel 70 is mounted on the armrest casing 10. In a preferred embodiment, the control panel 70 is mounted on a top of the armrest casing 10. The control panel 70 is electrically connected to the control system, such that the user can control the frontward-moving power device 30 and the upward-moving power device 50 to control the movements and positions of the frontward-moving stand 20 and the upward-moving stand 40 via the control panel 70.

With reference to FIGS. 1 to 4, when the armrest table is in use, the user can control the armrest table by the control panel 70. First, the frontward-moving power device 30 pushes the frontward-moving stand 20 forward to a specific position, and then the upward-moving power device 50 pushes the upward-moving stand 40 upward to a specific height. Afterwards, the user pulls up the table panel 60 to the highest position of its movement route, and then rotates the table panel 60 to make the table panel 60 horizontal in front of the seat. At this time, the user can further control the front and rear positions and the height of the table panel 60 by the control panel 70. As a result, the armrest table is mounted beside the seat for the passenger on the seat to adjust the table panel 60 himself.

In a preferred embodiment, the armrest table has two table panels 60 respectively for two passengers on two seats on both sides of the armrest table. But it is by no means limited by the abovementioned, as the two table panels 60 also can afford four passengers on four seats in two pairs to use. The two pairs of the seats are disposed side by side, and the two seats of each pair are disposed opposite to each other. In a preferred embodiment, a tissue box 12, a foam armrest 13, a flip-cover touch screen 14 may be mounted on the top of the armrest casing 10. A woofer 15 may be mounted on a side wall of the armrest casing 10.

In another preferred embodiment, the armrest table may be implemented without the upward-moving stand and the upward-moving power device, and the table panel is directly mounted in the frontward-moving stand. When the armrest table is in use, the frontward-moving stand is moved out of the armrest casing, and then the user can pull out the table panel.

When the armrest table is implemented without the upward-moving stand and the upward-moving power device, the upper contact switch, the lower contact switch, the pushing device, the cushion, and the rubber abutters of the upward-moving stand are mounted on the frontward-moving stand.

In another preferred embodiment, the frontward-moving power device may be implemented with structure other than the pusher motor, and the upward-moving power device may be implemented with structure other than the motor, the threaded rod, and the nut, as long as the two power devices can push and pull other objects.

Figure 18:
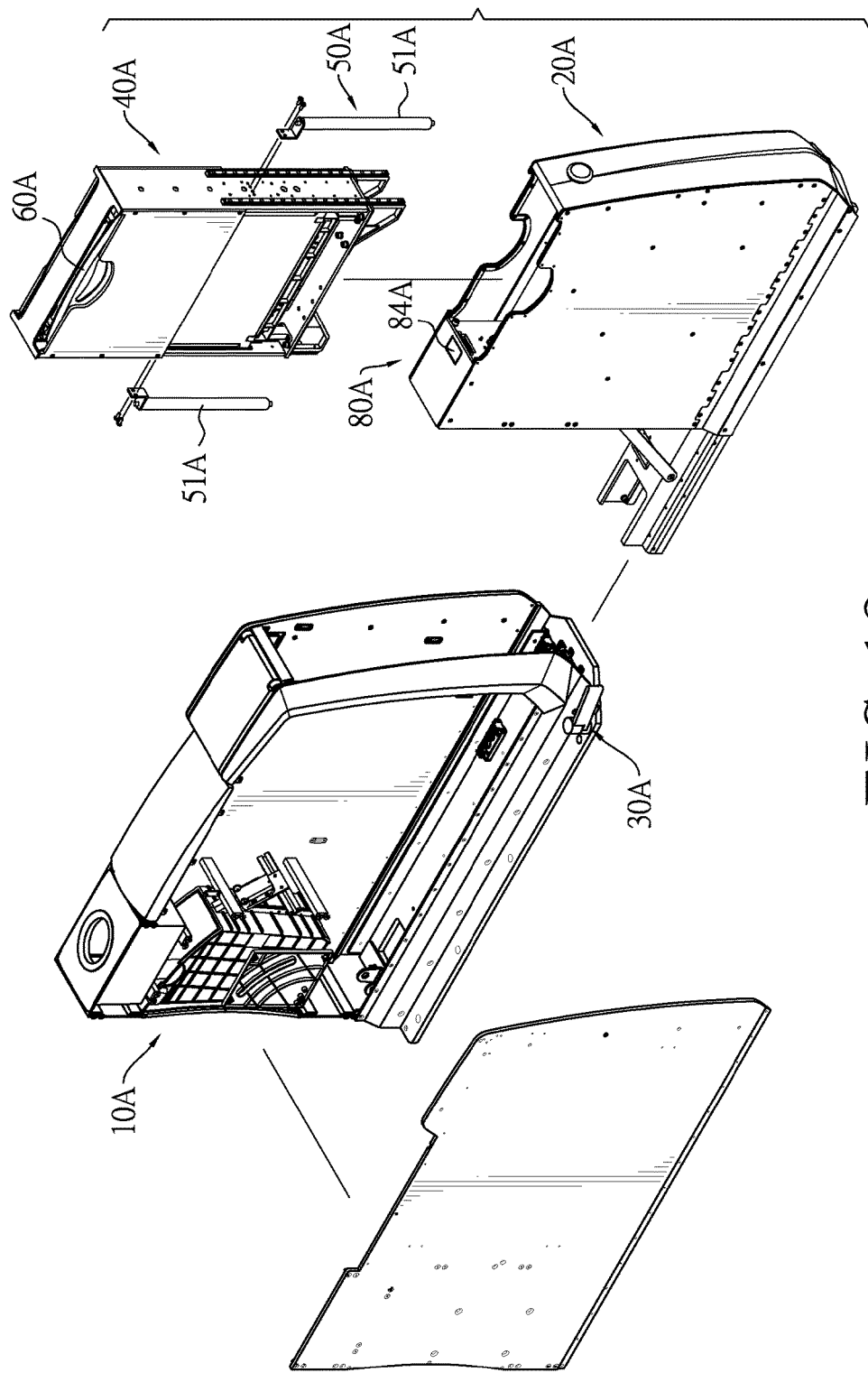
FIG. 18 is an exploded perspective view of a second embodiment of an armrest table in accordance with the present invention.
Figure 19:
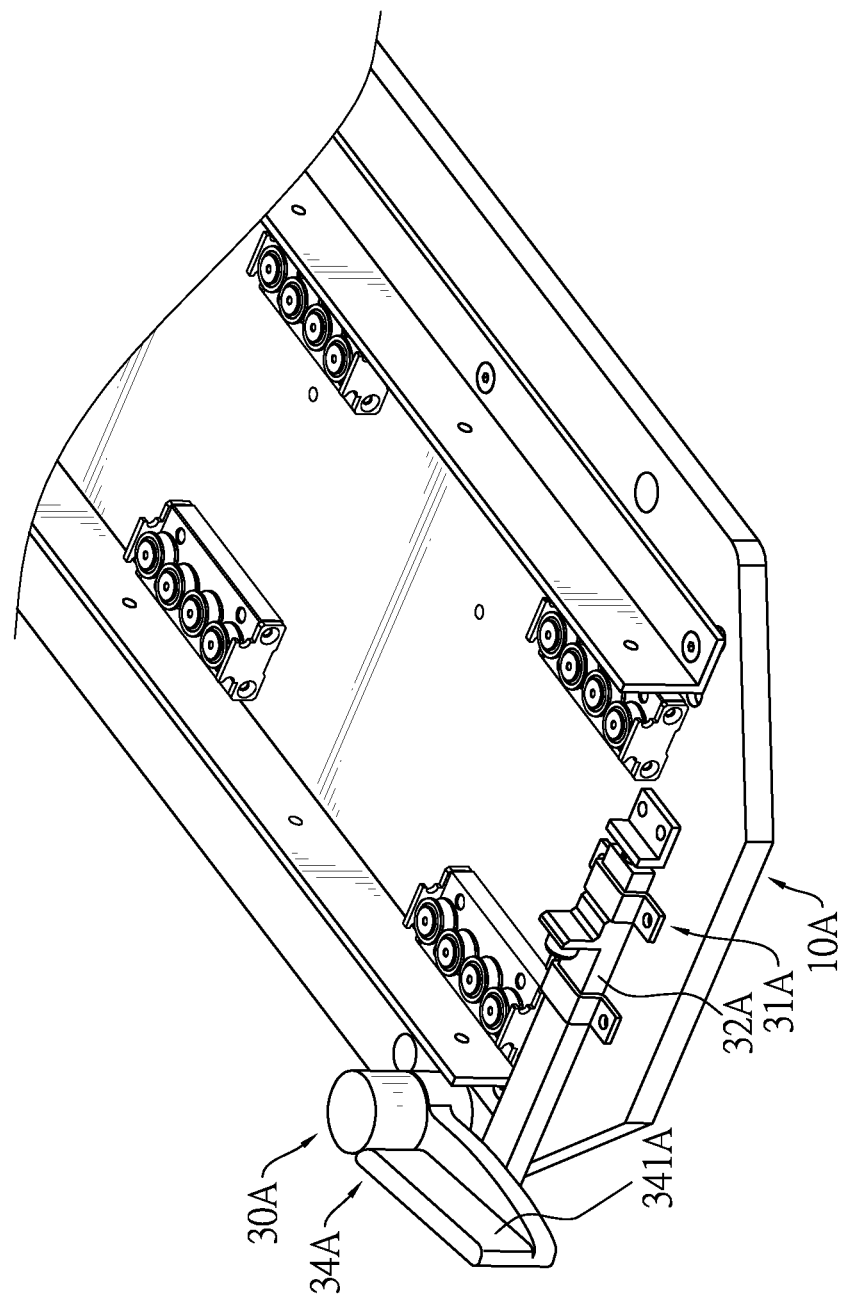
FIG. 19 is a perspective view of an abutting device and the bearing assemblies of the armrest table in FIG. 18.
Figure 20:
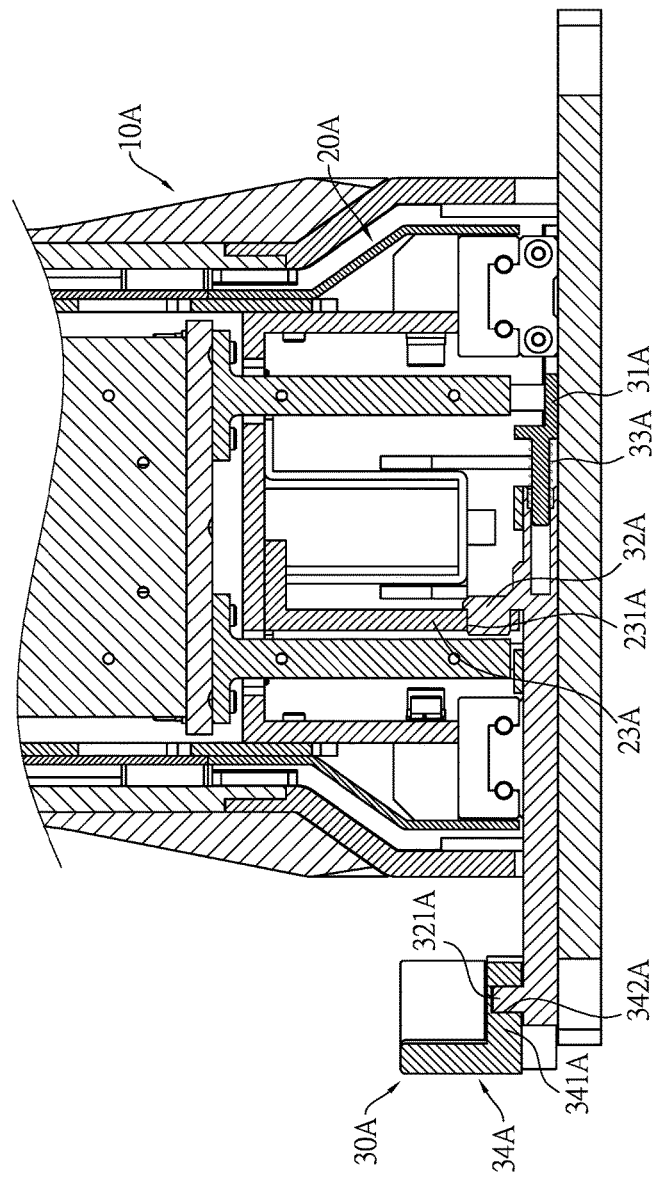
FIG. 20 is a first operational front view in partial section of the abutting device of the armrest table in FIG. 18.
Figure 21:
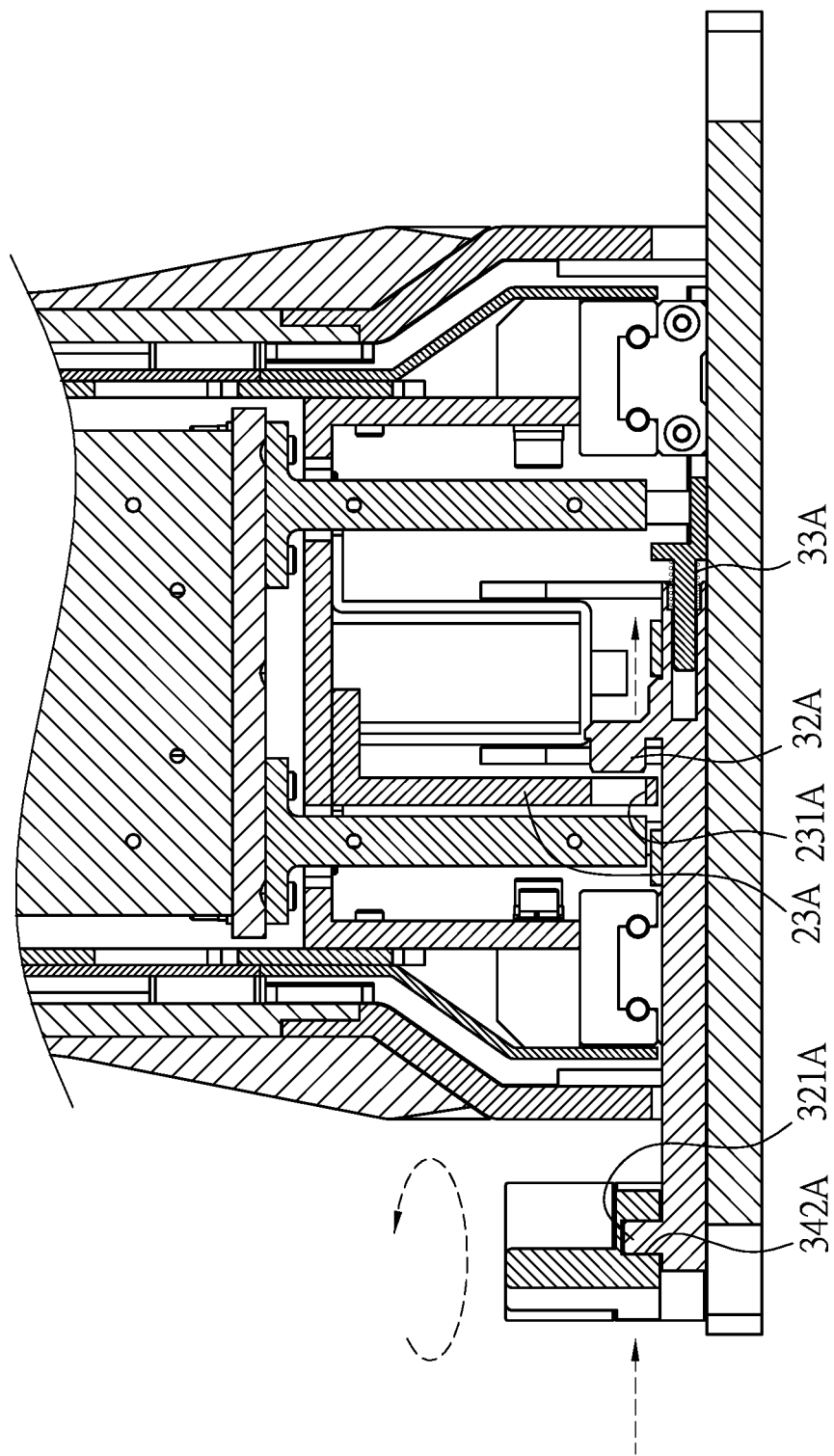
FIG. 21 is a second operational front view in partial section of the abutting device of the armrest table in FIG. 18.

With reference to FIG. 18, a second embodiment of an armrest table in accordance with the present invention is similar to the first embodiment as mentioned above. However, the two embodiments have some differences as follows.

The second embodiment is totally manual in operation, and does not have the frontward-moving power device, the upward-moving power device, the control panel, and the control system. Instead, the second embodiment has an abutting device 30A, a power device 50A, and a locking device 80A.

Figure 23:
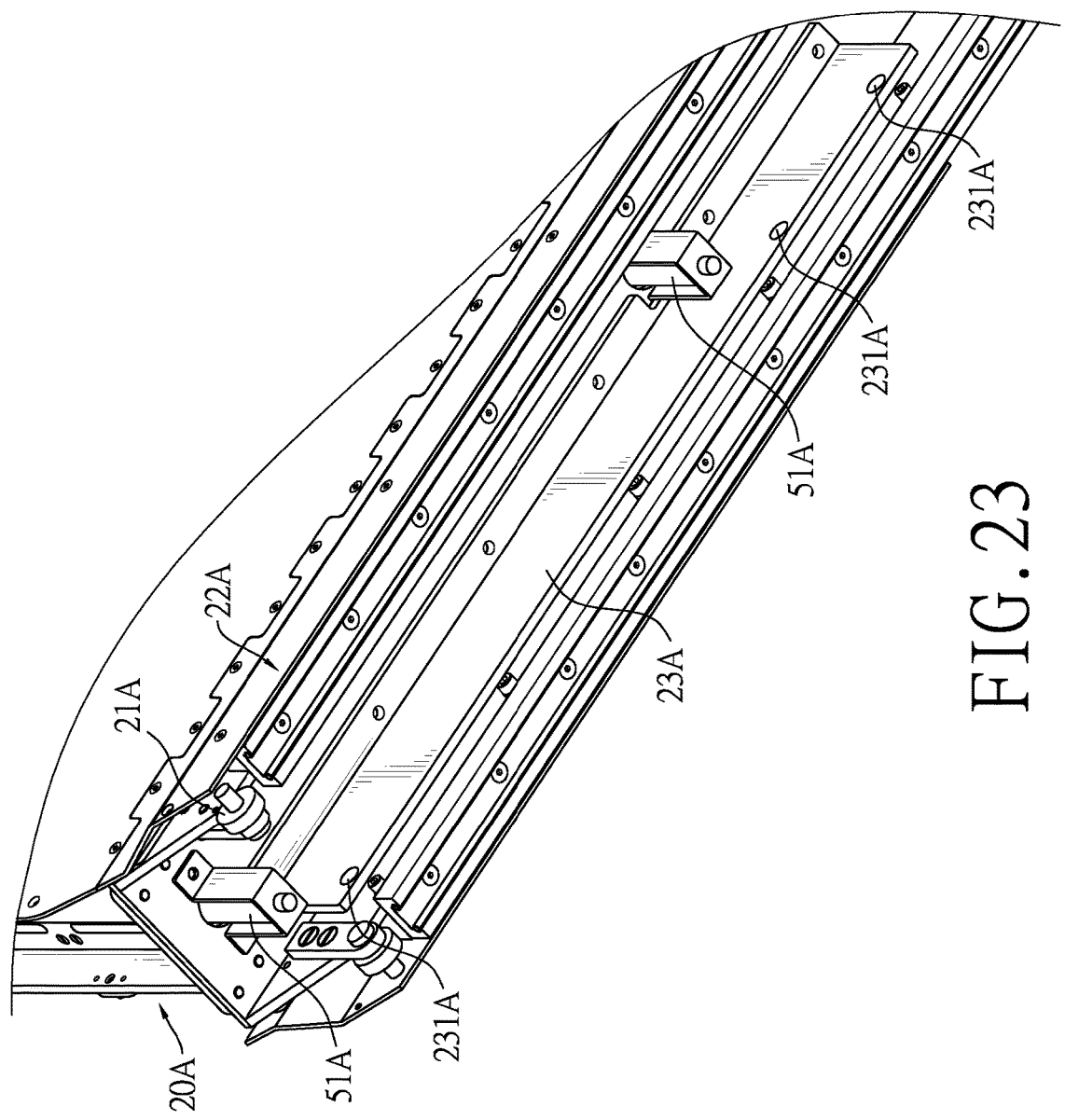
FIG. 23 is a bottom perspective view of the frontward-moving stand of the armrest table in FIG. 18.

With reference to FIG. 23, the frontward-moving stand 20A has a positioning panel 23A mounted on the bottom of the frontward-moving stand 20A. The positioning panel 23A has multiple second positioning holes 231A, which are transversely formed through the positioning panel 23A and are arranged front and rear apart from each other.

With reference to FIGS. 19 to 23, the abutting device 30A is mounted on the armrest casing 10A, and has a second mounting stand 31A, a second inserting unit 32A, an abutting resilient element 33A, and a pedal 34A. The second mounting stand 31A is mounted securely on the bottom of the inner space of the armrest casing 10A, and is disposed adjacent to the front opening of the armrest casing 10A. In a preferred embodiment, the second mounting stand 31A includes, but not limited to, multiple components. The second inserting unit 32A is moveably mounted in the second mounting stand 31A, and is selectively mounted in one of the second positioning holes 231A of the positioning panel 23A of the frontward-moving stand 20A. Thus, the frontward-moving stand 20A can be fixed in different front-and-rear relative positions. In a preferred embodiment, the second inserting unit 32A is elongated, and has a protrusion 321A formed on a top of one of the ends of the second inserting unit 32A.

The abutting resilient element 33A is mounted in the second mounting stand 31A, and abuts the second inserting unit 32A to make the second inserting unit 32A mounted in one of the second positioning holes 231A of the frontward-moving stand 20A.

The pedal 34A is pivotally connected to the bottom of the inner space of the armrest casing 10A. In a preferred embodiment, a rotating shaft between the pedal 34A and the armrest casing 10A is vertically disposed. The pedal 34A is exposed out of the armrest casing 10A, and abuts the second inserting unit 32A. The pedal 34A has an extending part 341A and an elongated recess 342A. The extending part 341A transversely protrudes from the pedal 34A. The elongated recess 342A is formed in a bottom of the extending part 341A. The protrusion 321A of the second inserting unit 32A is mounted in the elongated recess 342A. Thus, when the pedal 34A is rotated, the pedal 34A transversely pushes the second inserting unit 32A via the elongated recess 342A, thereby separating the second inserting unit 32A from the second positioning holes 231A of the frontward-moving stand 20A.

Figure 24:
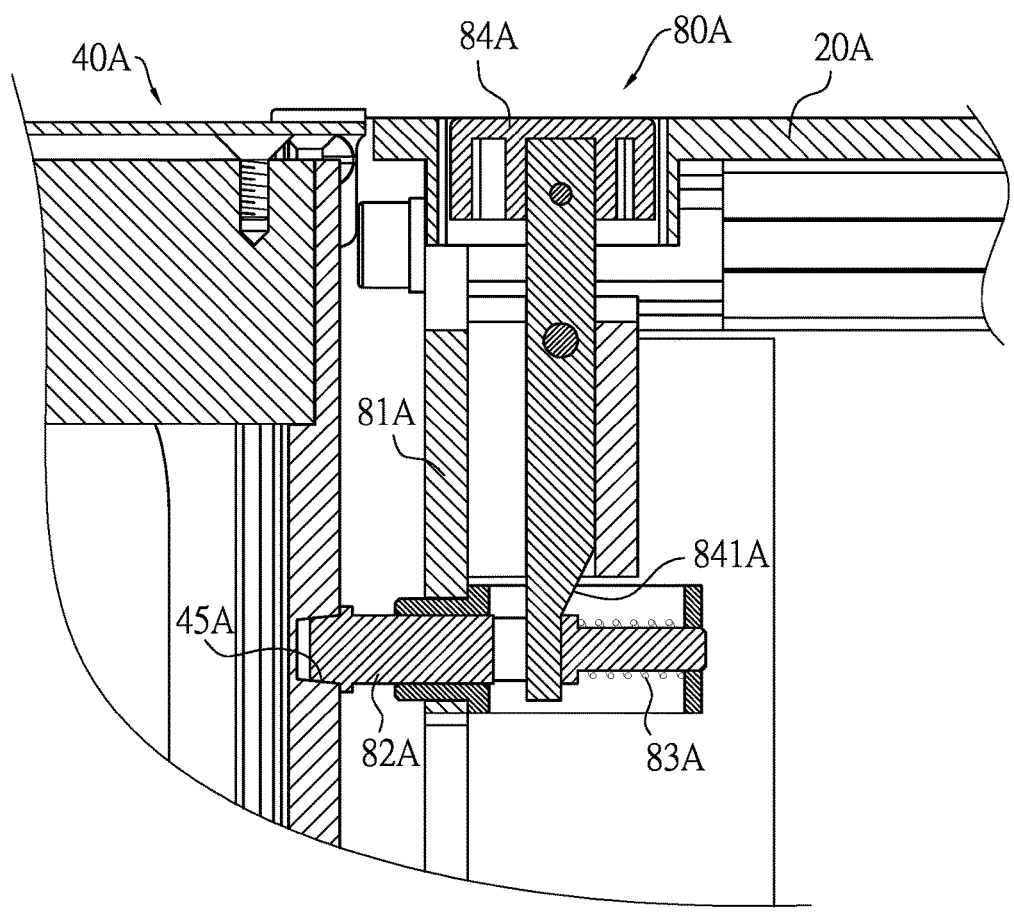
FIG. 24 is a first front view in partial section of a locking device of the armrest table in FIG. 18.
Figure 25:
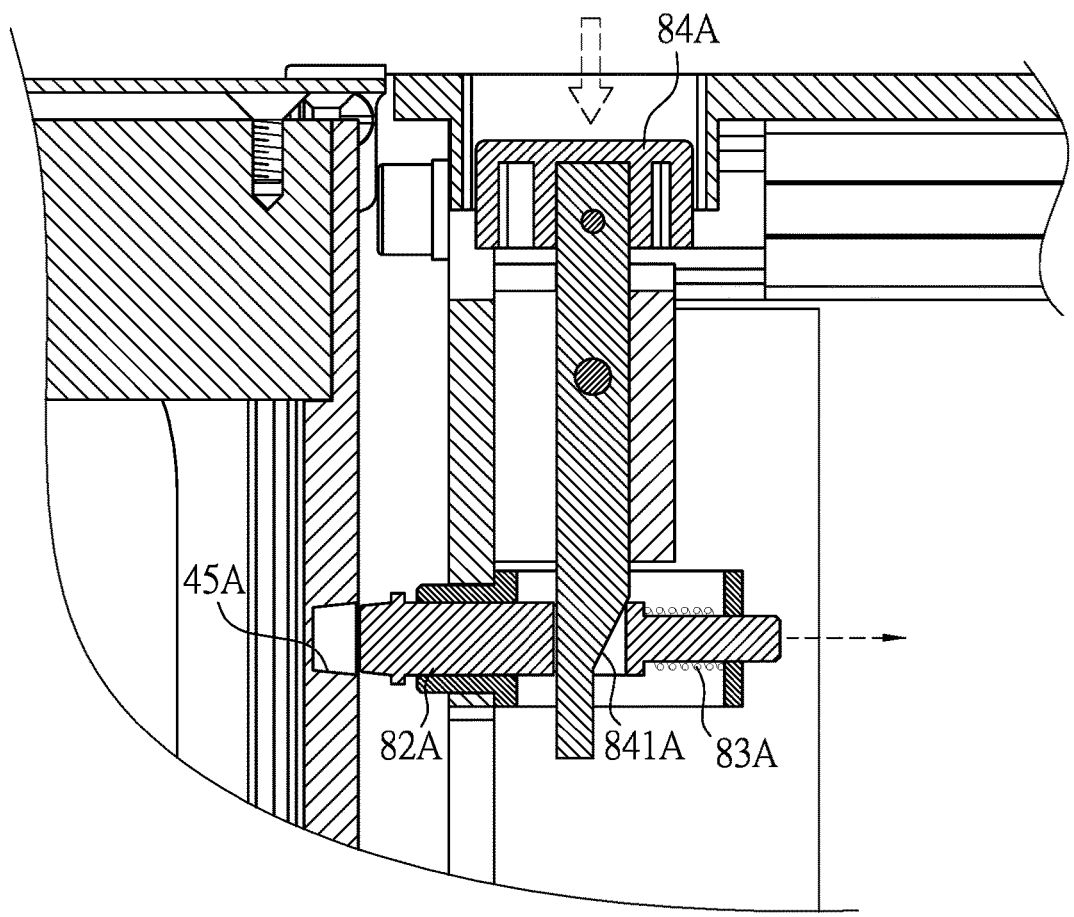
FIG. 25 is a second front view in partial section of the locking device of the armrest table in FIG. 18.
Figure 26:
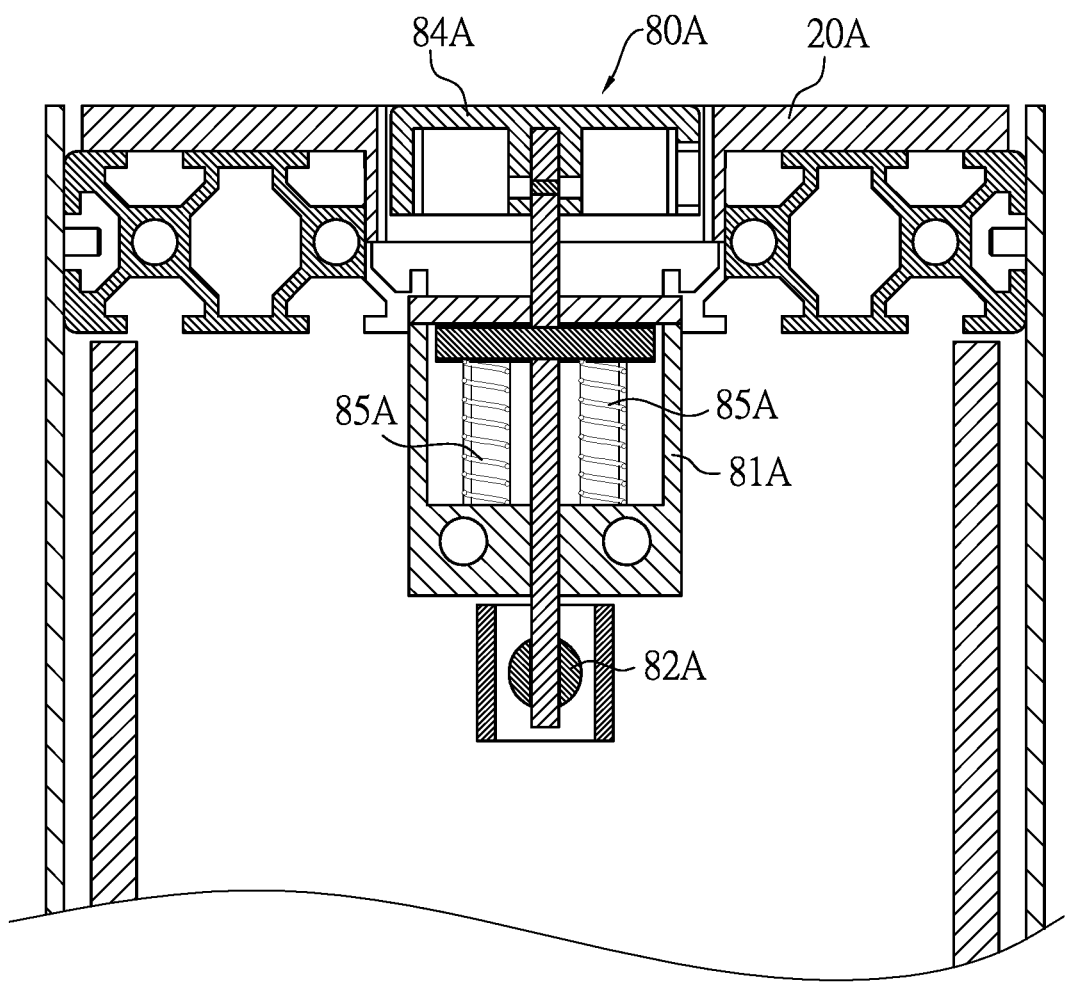
FIG. 26 is a rear view in partial section of the locking device of the armrest table in FIG. 18.
Figure 27:
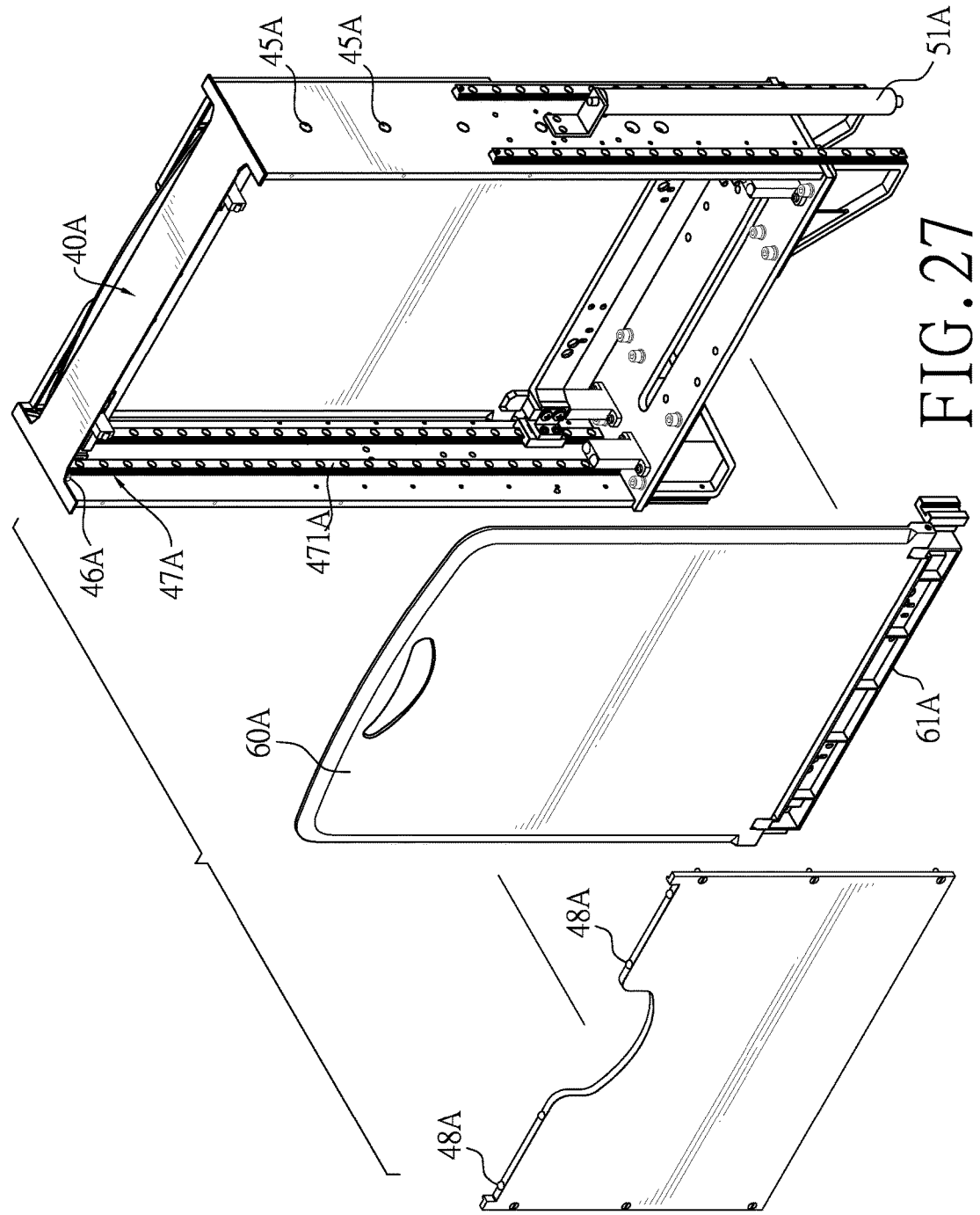
FIG. 27 is an exploded perspective view of the upward-moving stand and the table panel of the armrest table in FIG. 18.
Figure 28:
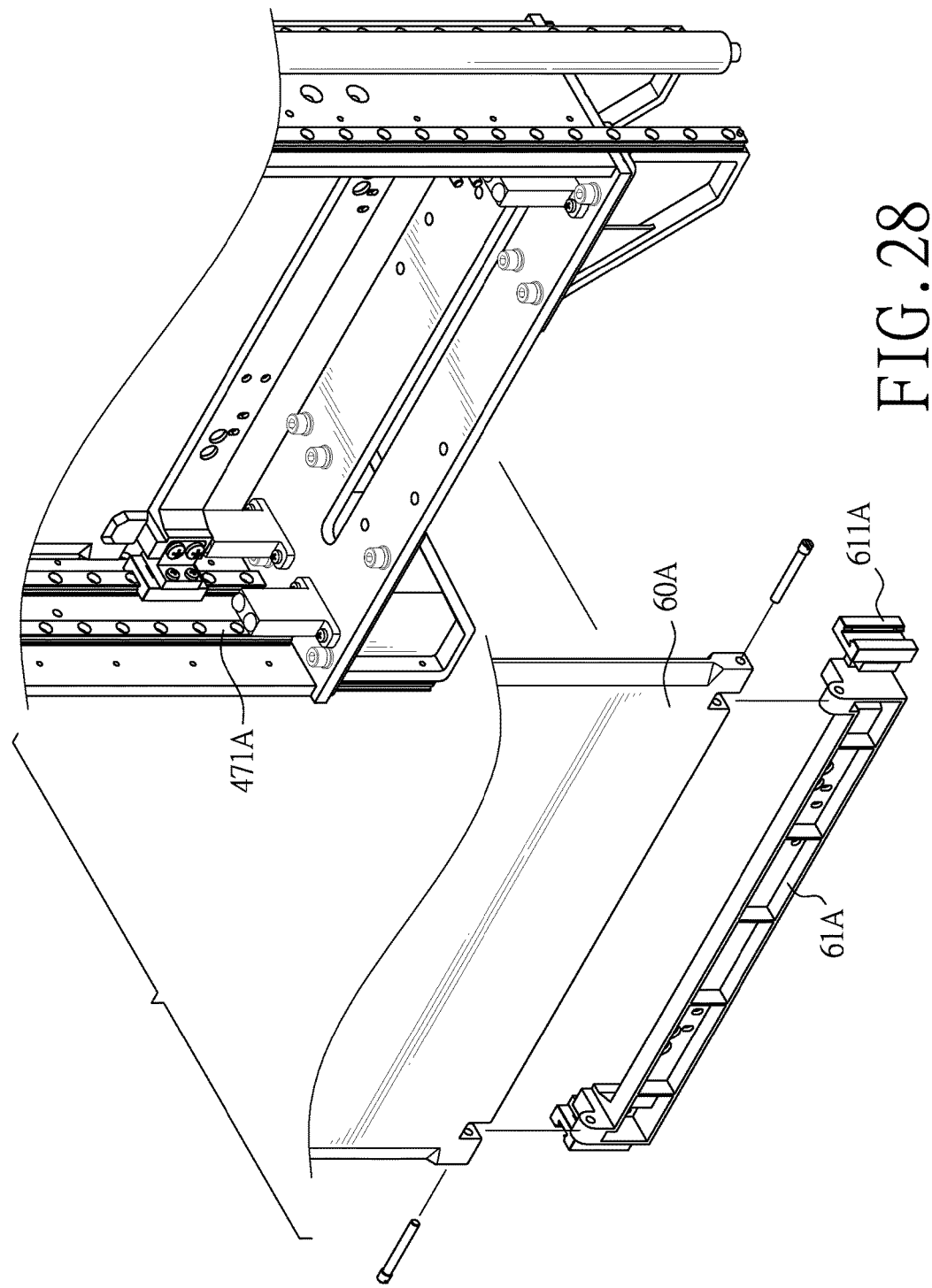
FIG. 28 is an exploded perspective view of the table panel of the armrest table in FIG. 18.
Figure 29:
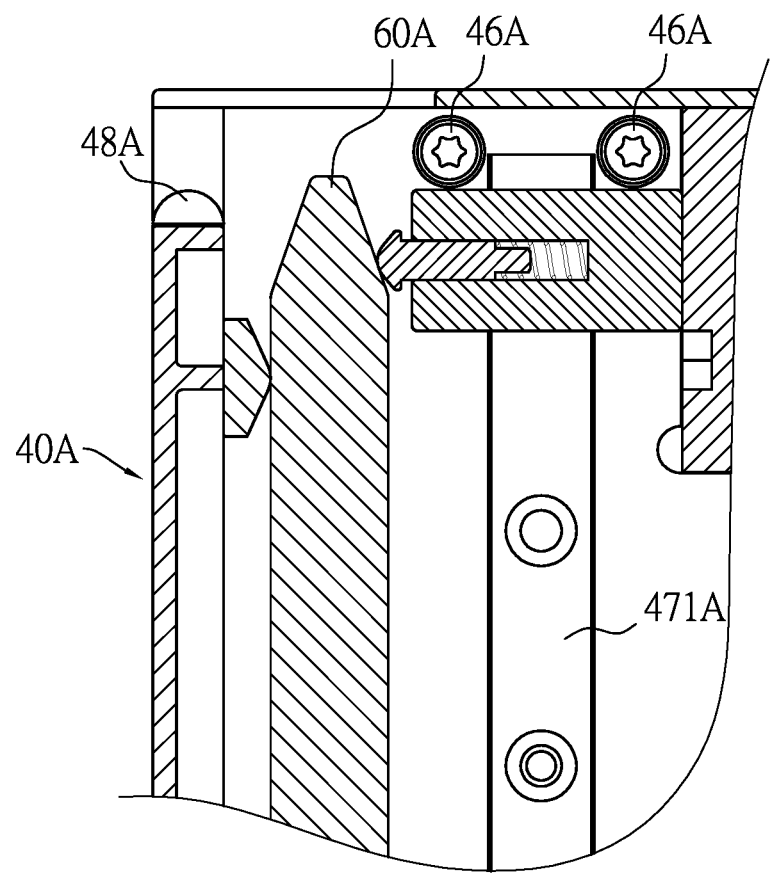
FIG. 29 is a first operational rear view in partial section of the table panel of the armrest table in FIG. 18.
Figure 30:
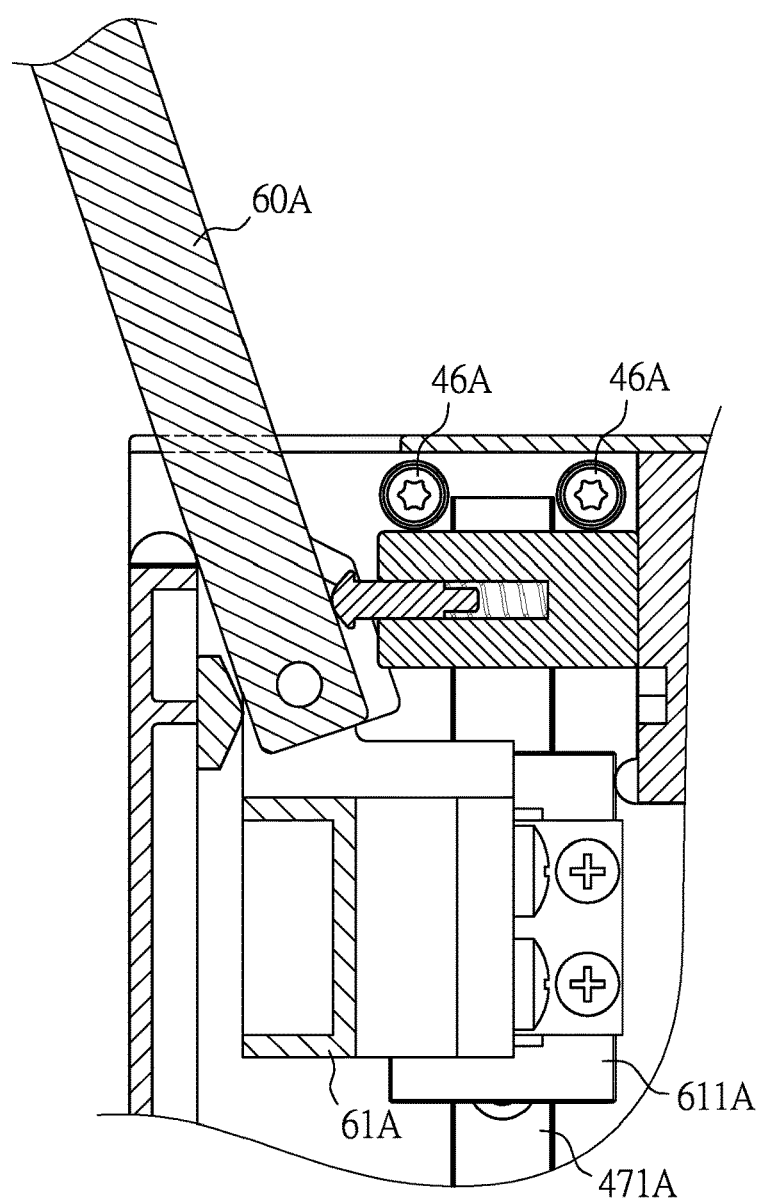
FIG. 30 is a second operational rear view in partial section of the table panel of the armrest table in FIG. 18.
Figure 31:
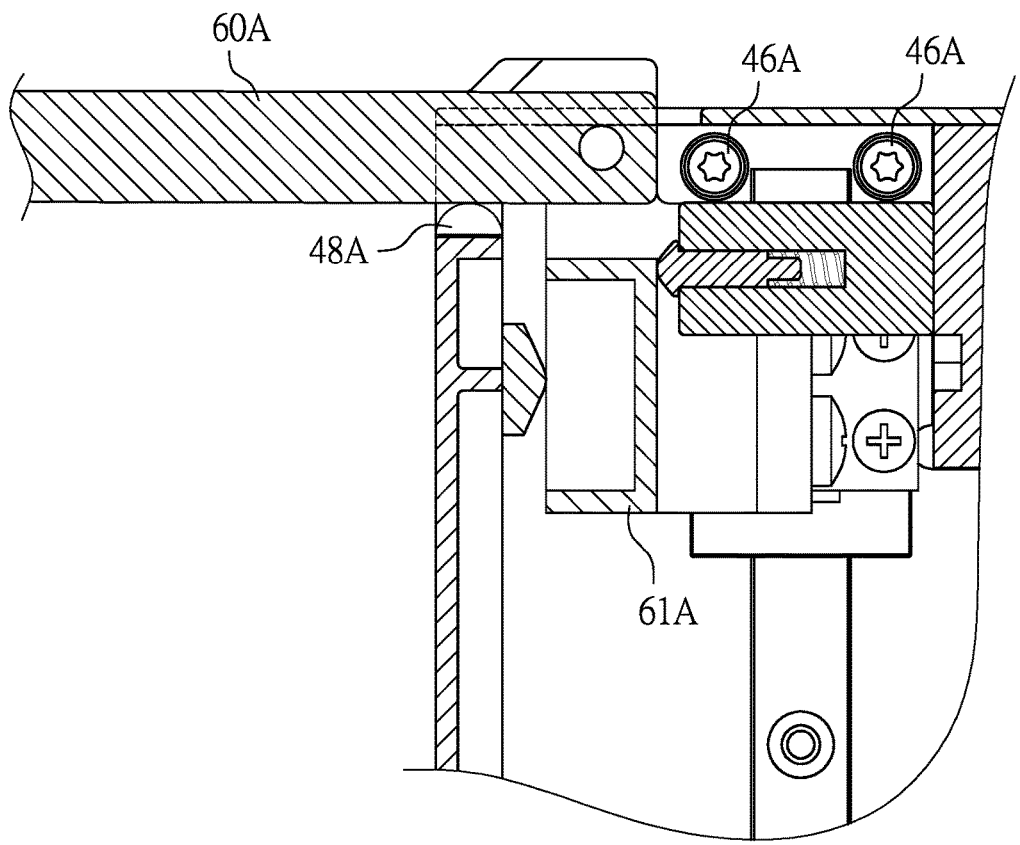
FIG. 31 is a third operational rear view in partial section of the table panel of the armrest table in FIG. 18.

With reference to FIGS. 24 and 27, the upward-moving stand 40A has multiple first positioning recesses 45A formed in a side wall of the upward-moving stand 40A, and the first positioning recesses 45A are arranged vertically apart from each other.

Figure 22:
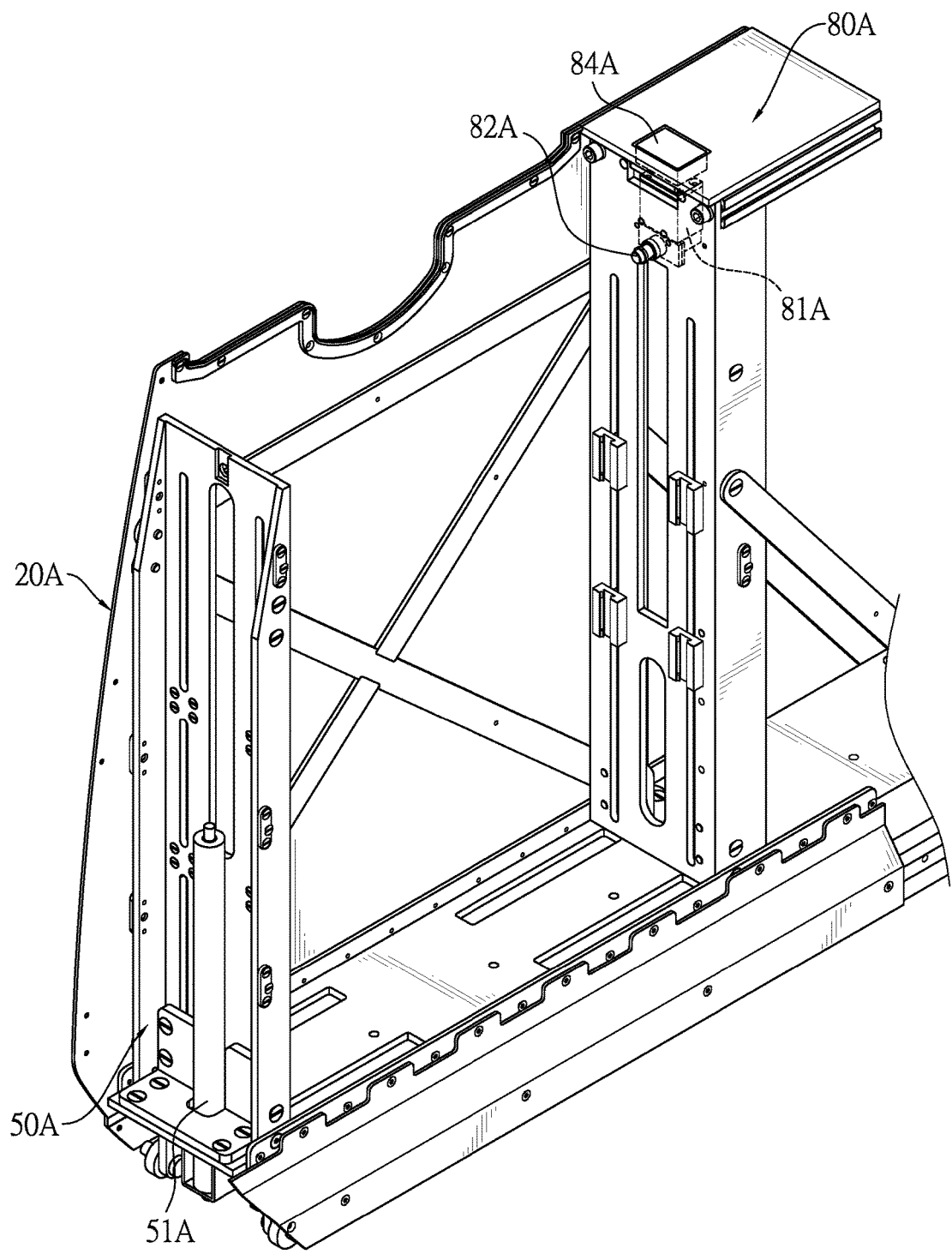
FIG. 22 is an exploded perspective view of the frontward-moving stand of the armrest table in FIG. 18.

With reference to FIGS. 18, 22, and 27, the power device 50A is mounted on the frontward-moving stand 20A, is connected to the upward-moving stand 40A, and pushes the upward-moving stand 40A upward. In a preferred embodiment, the power device 50A has two hydraulic gas struts 51A. The two hydraulic gas struts 51A are mounted on the frontward-moving stand 20A, are respectively on a front side and a rear side of the upward-moving stand 40A, are connected to the upward-moving stand 40A, and push the upward-moving stand 40A upward. When a top end of the upward-moving stand 40A does not abut the armrest casing 10A and no external force is applied downward on the upward-moving stand 40A, the power device 50A pushes the upward-moving stand 40A upward.

With reference to FIGS. 18, 22, and 24 to 26, the locking device 80A is mounted on the frontward-moving stand 20A, and selectively fixes the upward-moving stand 40A on the frontward-moving stand 20A. In a preferred embodiment, the locking device 80A has a first mounting stand 81A, a first inserting unit 82A, a transverse resilient element 83A, a pressing unit 84A, and two vertical resilient elements 85A.

The first mounting stand 81A is mounted securely on the frontward-moving stand 20A, and is disposed adjacent to a top of the frontward-moving device 20A.

The first inserting unit 82A is transversely and moveably mounted in the first mounting stand 81A, and selectively protrudes out of the first mounting stand 81A and mounted in one of the first positioning recesses 45A of the upward-moving stand 40A. Thus, the upward-moving stand 40A can be fixed at different heights.

The transverse resilient element 83A is mounted in the first mounting stand 81A, and transversely abuts the first inserting unit 82A to make the first inserting unit 82A mounted in one of the first positioning recesses 45A of the upward-moving stand 40A.

The pressing unit 84A is up and down moveably mounted in the first mounting stand 81A, and is exposed out of the frontward-moving stand 81A for the user to press down. The pressing unit 84A has a slope 841A formed on the pressing unit 84A, and abuts the first inserting unit 82A. When the pressing unit 84A is pressed downward, the slope 841A transversely pushes the first inserting unit 82A to make the first inserting unit 82A separate from the first positioning recesses 45A of the upward-moving stand 40A.

The two vertical resilient elements 85A are mounted in the first mounting stand 81A and push the pressing unit 84A upward to prevent the pressing unit 84A from abutting the first inserting unit 82A when the pressing unit 84A is not pressed. However, the locking device 80A may be implemented without the vertical resilient elements 85A if the transverse resilient element 83A is sufficient to push up the pressing unit 84A by the slope 841A.

With reference to FIGS. 27 to 31, the upward-moving stand 40A has two engaging channel assemblies 47A mounted on the inner wall of the upward-moving stand 40A. Each engaging channel assembly 47A corresponds to a table panel 60A, and has two engaging channels 471A respectively disposed on two opposite sides of the upward-moving stand 40A. Each engaging channel 471A extends up and down.

The upward-moving stand 40A has multiple positioning units 46A mounted on the upward-moving stand 40A for abutting the table panels 60A. The positioning units 46A are mounted on two opposite sides of the inner space of the upward-moving stand 40A, such that the positioning units 46A can abut two sides of the table panel 60A. In a preferred embodiment, the positioning unit 46A is, but not limited to, a screw screwed into the upward-moving stand 40A. The upward-moving stand 40A has multiple supporting units 48A mounted on the top of the upward-moving stand 40A for abutting the table panels 60A. The table panel 60A selectively downward abuts the supporting units 48A. The supporting units 48A are respectively disposed adjacent to the two table panel openings. The supporting units 48A and the positioning units 46A corresponding to the same table panel opening are disposed in two opposite sides of said table panel opening.

The engaging frame 61A of the table panel 60A has two guiding stands 611A mounted on two opposite sides of the engaging frame 61A. The two guiding stands 611A are respectively and slidably mounted around the two engaging channels 471A of the corresponding engaging channels 47A. The engaging frame 61A selectively upward abuts the positioning units 46A.

The table panel 60A is moved vertically upward because of the engagement of the engaging channel assembly 47A. The table panel 60A is moved upward until the engaging frame 61A upward abuts the positioning units 46A. At this time, the table panel 60A has reached the highest position of its movement route. Then, the table panel 60A is rotated until the table panel 60A downward abuts the supporting unit 48A. At this time, the table panel 60A has been disposed horizontally, and the supporting units 48A and the positioning units 46A create leverage to stably keep the table panel 60A horizontal.

When the armrest table is in use, the user first stamps on the pedal 34A by his foot to separate the second inserting unit 32A from the second positioning holes 231A of the frontward-moving stand 20A. Then, the user can manually pull out the frontward-moving stand 20A until the second inserting unit 32A is mounted in the next second positioning hole 231A of the frontward-moving stand 20A. At this time, the upward-moving stand 40A and the table panel 60A are moved out of the armrest casing 10A, and the pressing unit 84A of the locking device 80A has been exposed. Then, the pressing unit 84A is pressed to separate the first inserting unit 82A from the first positioning recess 45A of the upward-moving stand 40A. At this time, the hydraulic gas struts 51A of the power device 50A automatically push upward the upward-moving stand 40A until the first inserting unit 82A is mounted into the next first positioning recess 45A of the upward-moving stand 40A. Afterwards, the user pulls up the table panel 60 to the highest position of its movement route, and then rotates the table panel 60 to make the table panel 60 horizontal in front of the seat.

The user can further control the front and rear positions and the height of the table panel 60 by stamping on the pedal 34A and pressing the pressing unit 84A.

In another preferred embodiment, the armrest table may be implemented without the upward-moving stand and the power device, and the table panel is mounted in the frontward-moving stand. When the armrest table is in use, the frontward-moving stand is moved out of the armrest casing, and then the user can pull out the table panel.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An armrest table comprising:
   an armrest casing having
      an inner space; and
      a front opening communicating with the inner space of the armrest casing;
   a frontward-moving stand front and rear movably mounted in the armrest casing, capable of moving out of the front opening of the armrest casing, and having an inner space; and
      a top opening communicating with the inner space of the frontward-moving stand;
   at least one table panel up and down moveably mounted in the frontward-moving stand, and capable of moving out of the top opening of the frontward-moving stand;
   wherein when the at least one table panel is moved to a highest position of its movement route, the at least one table panel is rotatable to be horizontal;
   wherein when the at least one table panel is moved to a lowest position of its movement route, the frontward-moving stand and the at least one table panel are capable of being received in the armrest casing;

a frontward-moving power device mounted in the armrest casing, connected to the frontward-moving stand, and capable of moving the frontward-moving stand front and rear;

a control panel mounted on the armrest casing; and a control system electrically connected to the control panel and the frontward-moving power device, such that the control panel controls a movement and a position of the frontward-moving stand by the frontward-moving power device.

2. The armrest table as claimed in claim 1, wherein the frontward-moving power device has a pusher motor having a pushing rod being movable and connected securely to the frontward-moving stand.

3. The armrest table as claimed in claim 1, wherein the frontward-moving power device has a frontward-moving gear rack mounted in the armrest casing, and extending front and rear; and a frontward-moving potentiometer mounted on the frontward-moving stand, electrically connected to the control system, and having a frontward-moving gear being rotatable, and engaging with the frontward-moving gear rack.

4. The armrest table as claimed in claim 1 further comprising:

an upward-moving stand up and down movably mounted in the frontward-moving stand, capable of moving out of the top opening of the frontward-moving stand, and having an inner space; and at least one table panel opening communicating with the inner space and formed in a top of the upward-moving stand, wherein the at least one table panel is up and down movably mounted in the upward-moving stand, and is capable of moving out of the at least one table panel opening of the upward-moving stand; and an upward-moving power device mounted on the frontward-moving stand, connected to the upward-moving stand, and capable of moving the upward-moving stand up and down;

wherein the control system is electrically connected to the upward-moving power device, such that the control panel controls a movement and a position of the upward-moving stand by the upward-moving power device;

wherein when the at least one table panel is moved to the lowest position of its movement route and the upward-moving stand is moved to a lowest position of its movement route, the frontward-moving stand, the upward-moving stand and the at least one table panel are capable of being received in the armrest casing.

5. The armrest table as claimed in claim 4 wherein the upward-moving power device has an upward-moving gear rack mounted on the frontward-moving stand, and extending up and down; and an upward-moving potentiometer mounted on the upward-moving stand, electrically connected to the control system, and having an upward-moving gear being rotatable and engaging with the upward-moving gear rack.

6. The armrest table as claimed in claim 4 wherein the upward-moving power device has an upper stand contact switch mounted on the frontward-moving stand, selectively actuated by the upward-moving stand, and electrically connected to the control system; and a lower stand contact switch mounted on the frontward-moving stand, selectively actuated by the upward-moving stand, and electrically connected to the control system;

wherein the upper stand contact switch and the lower stand contact switch are arranged vertically apart from each other.

7. The armrest table as claimed in claim 4 further comprising:

at least one table panel contact device corresponding to the at least one table panel, and each one of the at least one table panel contact device having an upper panel contact switch mounted on the upward-moving stand, selectively actuated by the corresponding table panel, and electrically connected to the control system; and a lower panel contact switch mounted on the upward-moving stand, selectively actuated by the corresponding table panel, and electrically connected to the control system;

wherein the upper panel contact switch and the lower panel contact switch are arranged vertically apart from each other.

8. The armrest table as claimed in claim 4, wherein the upward-moving stand has at least one pushing device mounted on an inner wall of the upward-moving stand, disposed adjacent to the at least one table panel opening of the upward-moving stand, and each one of the at least one pushing device having a second abutter; and a second resilient element pushing the second abutter to make the second abutter abut against the corresponding table panel.

9. The armrest table as claimed in claim 1, wherein each one of the at least one table panel has an engaging frame pivotally connected to a bottom side of said table panel, wherein when said table panel is rotated to be horizontal, said table panel abuts the engaging frame;

at least one first abutter mounted on the engaging frame; and at least one first resilient element mounted on the engaging frame, and pushing the at least one first abutter to make the at least one first abutter abut against said table panel.

10. An armrest table comprising:

an armrest casing having an inner space; and a front opening communicating with the inner space of the armrest casing;

a frontward-moving stand front and rear movably mounted in the armrest casing, capable of moving out of the front opening of the armrest casing, and having an inner space; and a top opening communicating with the inner space of the frontward-moving stand;

at least one table panel up and down moveably mounted in the frontward-moving stand, and capable of moving out of the top opening of the frontward-moving stand;

wherein when the at least one table panel is moved to a highest position of its movement route, the at least one table panel is rotatable to be horizontal;

wherein when the at least one table panel is moved to a lowest position of its movement route, the frontward-moving stand and the at least one table panel are capable of being received in the armrest casing;

an upward-moving stand up and down movably mounted in the frontward-moving stand, capable of moving out of the top opening of the frontward-moving stand, and having an inner space; and at least one table panel opening communicating with the inner space and formed in a top of the upward-moving stand, wherein the at least one table panel is up and down movably mounted in the upward-moving stand, and is capable of moving out of the at least one table panel opening of the upward-moving stand;

a power device mounted on the frontward-moving stand, connected to the upward-moving stand, and pushing the upward-moving stand upward; and a locking device mounted on the frontward-moving stand, and selectively fixing the upward-moving stand on the frontward-moving stand;

wherein when the at least one table panel is moved to the lowest position of its movement route and the upward-moving stand is moved to a lowest position of its movement route, the frontward-moving stand, the upward-moving stand and the at least one table panel are capable of being received in the armrest casing.

11. The armrest table as claimed in claim 10, wherein the power device has at least one hydraulic gas strut mounted on the frontward-moving stand, connected to the upward-moving stand, and pushing the upward-moving stand upward.

12. The armrest table as claimed in claim 10, wherein the upward-moving stand has multiple first positioning recesses formed in a side wall of the upward-moving stand, and arranged vertically apart from each other; and the locking device has a first mounting stand mounted securely on the frontward-moving stand;

a first inserting unit transversely and moveably mounted in the first mounting stand, and selectively mounted in one of the first positioning recesses of the upward-moving stand;

a transverse resilient element mounted in the first mounting stand, and abutting the first inserting unit to make the first inserting unit mounted in one of the first positioning recesses of the upward-moving stand; and a pressing unit up and down moveably mounted in the first mounting stand, exposed out of the frontward-moving stand, and abutting the first inserting unit, wherein when the pressing unit is pressed downward, the pressing unit pushes the first inserting unit to make the first inserting unit separate from the first positioning recesses.

13. The armrest table as claimed in claim 12, wherein the locking device has at least one vertical resilient element mounted in the first mounting stand and pushing the pressing unit upward.

14. The armrest table as claimed in claim 10, wherein the upward-moving stand has at least one engaging channel assembly mounted on an inner wall of the upward-moving stand, each one of the at least one engaging channel assembly has two engaging channels respectively disposed on two opposite sides of the upward-moving stand, and extending up and down; and each one of the at least one table panel has an engaging frame pivotally connected to a bottom side of said table panel, and having two guiding stands mounted on two opposite sides of the engaging frame, and respectively and slidably mounted around the two engaging channels of one of the at least one engaging channel assembly.

15. The armrest table as claimed in claim 10, wherein the frontward-moving stand has multiple second positioning holes disposed in a bottom of the frontward-moving stand, and arranged apart from each other front and rear; and the armrest table further has an abutting device mounted on the armrest casing, and having a second mounting stand mounted securely on the armrest casing;

a second inserting unit moveably mounted in the second mounting stand, and selectively mounted in one of the second positioning holes of the frontward-moving stand;

an abutting resilient element mounted in the second mounting stand, and abutting the second inserting unit to make the second inserting unit mounted in one of the second positioning holes of the frontward-moving stand; and a pedal pivotally connected to the armrest casing, exposed out of the armrest casing, and abutting the second inserting unit, wherein when the pedal is rotated, the pedal pushes the second inserting unit to make the second inserting unit separate from the second positioning holes of the frontward-moving stand.

16. The armrest table as claimed in claim 15, wherein the frontward-moving stand has a positioning panel mounted on a bottom of the frontward-moving stand, wherein the second positioning holes are transversely formed through the positioning panel;

the second inserting unit of the abutting device is transversely and moveably mounted in the second mounting stand; and a rotating shaft between the pedal and the armrest casing is disposed vertically.

17. The armrest table as claimed in claim 10, wherein the frontward-moving stand has at least one wheel mounted on a bottom of the frontward-moving stand.

18. An armrest table comprising:

an armrest casing having an inner space; and a front opening communicating with the inner space of the armrest casing;

a frontward-moving stand front and rear movably mounted in the armrest casing, capable of moving out of the front opening of the armrest casing, and having an inner space; and a top opening communicating with the inner space of the frontward-moving stand;

at least one table panel up and down moveably mounted in the frontward-moving stand, and capable of moving out of the top opening of the frontward-moving stand;

wherein when the at least one table panel is moved to a highest position of its movement route, the at least one table panel is rotatable to be horizontal;

wherein when the at least one table panel is moved to a lowest position of its movement route, the frontward-moving stand and the at least one table panel are capable of being received in the armrest casing;

at least one frontward-moving channel assembly mounted between the armrest casing and a bottom of the frontward-moving stand, each one of the at least one frontward-moving channel assembly having at least one bearing assembly mounted on a bottom of the inner space of the armrest casing, each one of the at least one bearing assembly having multiple left bearings arranged front and rear apart from each other; and multiple right bearings arranged front and rear apart from each other, wherein leftmost sides of the left bearings extend beyond leftmost sides of the right bearings, and rightmost sides of the right bearings extend beyond rightmost sides of the left bearings; and a frontward-moving channel stand mounted securely on the bottom of the frontward-moving stand, extending front and rear, and having two channel rods arranged transversely apart from each other, and front and rear slidably clamping the leftmost sides of the left bearings and the rightmost sides of the right bearings.

19. The armrest table as claimed in claim 18, wherein an amount of the at least one table panel is two, and when the two table panels are moved to the highest position of their movement route, the two table panels are capable of rotating respectively toward two opposite sides to be horizontal.

\* \* \* \* \*